US012037211B2

(12) United States Patent
Cheich et al.

(10) Patent No.: US 12,037,211 B2
(45) Date of Patent: Jul. 16, 2024

(54) SUPPLY OF SHEET STOCK MATERIAL FOR A DUNNAGE CONVERSION MACHINE AND A METHOD OF CONVERTING SAME INTO A DUNNAGE PRODUCT

(71) Applicant: Ranpak Corp., Concord Township, OH (US)

(72) Inventors: Robert C. Cheich, Independence, OH (US); Dennis J. Wagner, Painesville, OH (US); Brian Stinard, Twinsburg, OH (US); Hugo Van Ool, Heerlen (NL); Leon Hanssen, Landgraaf (NL); Mike Timmers, Mechelen (NL)

(73) Assignee: Ranpak Corp., Concord Township, OH (US)

(*) Notice: Subject to any disclaimer, the term of this patent is extended or adjusted under 35 U.S.C. 154(b) by 0 days.

(21) Appl. No.: 17/290,158

(22) PCT Filed: Oct. 30, 2019

(86) PCT No.: PCT/US2019/058879
§ 371 (c)(1),
(2) Date: Apr. 29, 2021

(87) PCT Pub. No.: WO2020/092578
PCT Pub. Date: May 7, 2020

(65) Prior Publication Data

US 2022/0002106 A1 Jan. 6, 2022

Related U.S. Application Data

(60) Provisional application No. 62/753,222, filed on Oct. 31, 2018, provisional application No. 62/906,506, filed on Sep. 26, 2019.

(51) Int. Cl.
*B65H 21/00* (2006.01)
*B31D 5/00* (2017.01)
(Continued)

(52) U.S. Cl.
CPC ....... *B65H 19/1852* (2013.01); *B31D 5/0039* (2013.01); *B31F 5/06* (2013.01);
(Continued)

(58) Field of Classification Search
CPC ...... B31F 5/00; B31F 5/04; B31F 5/06; B31F 5/08; B31F 5/085
See application file for complete search history.

(56) References Cited

U.S. PATENT DOCUMENTS 3,787,264 A * 1/1974 Underwood ......... B65H 19/102 156/509
6,756,096 B2 6/2004 Harding
(Continued)

FOREIGN PATENT DOCUMENTS

JP 2018516184 A 6/2018

OTHER PUBLICATIONS

First Examination Report dispatched Feb. 11, 2022, for co-pending Indian Patent application No. 202117019964.
(Continued)

*Primary Examiner* — Praachi M Pathak
(74) *Attorney, Agent, or Firm* — Renner, Otto, Boisselle & Sklar, LLP

(57) ABSTRACT

A supply (22) of sheet stock material (24, 34) for a dunnage conversion machine (26) that is readily spliced to another supply includes (a) one or more plies of sheet material (24, 34) having (i) multiple longitudinally-extending sections, including a center section (42) bounded by lateral sections (40), where the lateral sections (40) are folded over a common face of the center section (42) along longitudinal fold lines (44) at lateral edges of the folded sheet material, and (ii) a leading end (60) and a trailing end (62) at respective longitudinally-opposite ends of the sheet material, where the lateral sections (40) are separated from the
(Continued)

center section (42) adjacent the leading end (60) and adjacent the trailing end (62) along respective lines of separation; and (b) a splicing adhesive (76) applied to the sheet material adjacent the leading end (60) or the trailing end (62) on both the center section (42) and each of the lateral WO 2020/092578 A1 sections (40) to facilitate splicing each section to respective sections of two supplies.

9 Claims, 16 Drawing Sheets

(51) Int. Cl.
*B31F 5/06* (2006.01)
*B65H 19/18* (2006.01)

(52) U.S. Cl.
CPC ..... *B65H 21/00* (2013.01); *B31D 2205/0035* (2013.01); *B65H 2301/46212* (2013.01); *B65H 2301/46312* (2013.01); *B65H 2701/11231* (2013.01); *B65H 2701/1824* (2013.01); *B65H 2801/63* (2013.01); *Y10T 428/2419* (2015.01)

(56) References Cited

U.S. PATENT DOCUMENTS

| | | | | |
|---|---|---|---|---|
| 6,918,489 | B2 | 7/2005 | Harding et al. | |
| 9,808,131 | B2 * | 11/2017 | Larsson | B65D 85/62 |
| 2002/0100539 | A1 * | 8/2002 | Harding | B65H 19/1852 156/157 |
| 2012/0035038 | A1 * | 2/2012 | Lembach | B65H 21/00 493/381 |
| 2015/0014205 | A1 * | 1/2015 | Yap | B65D 83/0805 206/494 |
| 2017/0266907 | A1 * | 9/2017 | Chan | B65H 20/16 |

OTHER PUBLICATIONS

International Search Report and Written Opinion mailed Feb. 17, 2019, for International Patent Application No. PCT/US2019/058879.

International Preliminary Report on Patentability issued Apr. 27, 2021, for International Patent Application No. PCT/US2019/058879.

* cited by examiner

SUPPLY OF SHEET STOCK MATERIAL FOR A DUNNAGE CONVERSION MACHINE AND A METHOD OF CONVERTING SAME INTO A DUNNAGE PRODUCT

FIELD OF THE INVENTION

The present invention relates to a supply of sheet stock material for a dunnage conversion machine, and a method for converting the supply of sheet stock material into a dunnage product.

BACKGROUND

Dunnage products are used to pack articles in shipping containers and thus minimize or prevent damage to those articles during shipment. Dunnage products are used for cushioning, void-fill, blocking and bracing, and other packaging applications.

Rather than producing the dunnage products in a central location and then shipping the dunnage products to the end user, it may be more efficient to ship the stock material and then employ a dunnage conversion machine to convert the stock material into a less dense dunnage product at or near the location where the dunnage product will be put to use. Dunnage conversion machines are sometimes referred to as conversion machines or simply as converters. Upon initial start-up, a leading end of the sheet stock material must be fed into the converter to begin the dunnage conversion process. This can be difficult and time-consuming.

To minimize or eliminate disruption of the operation of the dunnage conversion machine and the conversion process, prior users have developed techniques to splice a new supply of sheet stock material to a nearly-depleted supply of sheet stock material. When the converter is once again operated, the trailing end of the almost-spent supply will pull the leading end of the new supply through the conversion machine. An exemplary sheet stock material is shown and described in U.S. Pat. Nos. 6,756,096 B2; and 6,918,489 B2.

A new type of sheet stock material suitable for existing and new conversion machines has several transversely-spaced, longitudinally-extending portions or sections. These longitudinally-extending sections have longitudinally-extending fold lines separating the sections, whereby one or more sections can be folded over another section or sections to form a narrower supply of sheet stock material for the same width of the sheet stock material. An exemplary sheet stock material has a pair of outer lateral sections bounding a center section may be inwardly folded over a common side of the center section forming a pair of transversely-spaced longitudinally-extending fold lines at the lateral edges of the supply and narrowing the overall width of the supply. The folded sheet stock material may be wound into a roll or fan-folded in alternating directions about regularly-spaced transverse fold lines. Edges of the sheet material of respective lateral sections are inwardly folded and may meet at a longitudinal centerline, overlap across the longitudinal centerline, or be spaced from the longitudinal centerline to leave a gap between the lateral sections. This new sheet stock material may be referred to as a C-fold sheet stock material. Because of the folded lateral sections, new techniques for splicing have emerged, such as is shown in U.S. Patent Application Publication No. US 2017/0266907 A1.

SUMMARY

While techniques have been developed to splice conventional, unfolded rolled or fan-folded sheet stock material, C-fold sheet stock material presents additional challenges because the leading and trailing ends do not have linear cross-sections. The C-fold sheet stock material has lateral portions folded over a center or central portion between the lateral portions, with the lateral portions folded inwardly over a common face of the center portion along longitudinally-extending fold lines.

The present invention provides a supply of reduced-width, C-fold sheet stock material for a dunnage conversion machine that can be readily spliced to another supply of sheet stock material, and a method for splicing sequential supplies of such a sheet stock material together. Several alternative embodiments are shown and described. The following paragraphs paraphrase the claims.

More particularly, the present invention provides a supply of sheet stock material for a dunnage conversion machine that is readily spliced to another supply. The supply includes (a) one or more plies of sheet material having (i) multiple longitudinally-extending sections, including a center section bounded by lateral sections, where the lateral sections are folded over a common face of the center section to form longitudinal fold lines at lateral edges of the folded sheet material, and (ii) a leading edge and a trailing edge at longitudinally-opposite ends of the sheet material, where the lateral sections are separated from the center section adjacent the leading edge and adjacent the trailing edge along respective lines of separation.

The supply further includes (b) a splicing adhesive applied to the sheet material adjacent the leading edge or the trailing edge on at least each of the lateral sections in such a manner to facilitate splicing each section to respective sections of another supply of sheet stock material.

The supply of sheet stock material may provide that the lateral sections are separated from the center section by a cut along respective longitudinal fold lines a distance of at least one centimeter.

The supply of sheet stock material for a dunnage conversion machine may have lateral sections separated from the center section by a cut along the respective longitudinal fold lines a distance of one centimeter to fifteen centimeters.

The supply of sheet stock material for a dunnage conversion machine may include two plies of sheet material.

The supply of sheet stock material for a dunnage conversion machine may have the lateral sections of both plies of sheet material inwardly folded together over a common face of the center section.

The supply of sheet stock material for a dunnage conversion machine may have the sheet stock material folded along lateral fold lines in opposite directions at periodic longitudinally-spaced intervals to form a rectangular fan-fold stack.

The supply of sheet stock material for a dunnage conversion machine may have adjacent the leading end of the sheet material a leading segment is folded along the nearest lateral fold line to extend down a side of the stack, and adjacent the trailing end of the sheet material a trailing segment is folded along the nearest lateral fold line to extend up the same side of the stack, and a strap around the stack holds the leading and trailing segments against the side of the stack.

The supply of sheet stock material for a dunnage conversion machine may have at least one ply of sheet material that includes kraft paper.

The supply of sheet stock material for a dunnage conversion machine may have the splicing adhesive provided by a double-sided tape, one side of which is secured to the sheet material and the other side of which is covered by a removable release liner.

The supply of sheet stock material for a dunnage conversion machine may include a splicing adhesive applied to the sheet material adjacent the leading edge or the trailing edge on both of a center section and each of the lateral sections. The present invention also provides a method for splicing sequential supplies of sheet stock material for a dunnage conversion machine. The method includes the following steps: (a) providing first and second supplies of sheet stock material, each with one or more plies of sheet material having (i) multiple longitudinally-extending sections, including a center section bounded by lateral sections, where the lateral sections are folded over a common face of the center section to form longitudinal fold lines at lateral edges of the folded sheet material, and (ii) a leading edge and a trailing edge at longitudinally-opposite ends of the sheet material, where the lateral sections are separated from the center section adjacent both the leading edge and the trailing edge along respective lines of separation; (b) attaching a trailing end of each lateral section of the first supply to respective leading ends of the lateral sections of the second supply.

The method may further include the step of placing the first supply on top of the second supply before the attaching steps.

The supply of sheet stock material for a dunnage conversion machine may include the step of attaching multiple plies in the first supply together and attaching multiple plies in the second supply together in the center section and in each of the lateral sections adjacent both the leading edge and the trailing edge. The method may further include the step of applying a splicing adhesive to the sheet material adjacent the leading edge or the trailing edge on both the center section and each of the lateral sections for each of the first supply and the second supply.

The step of applying a splicing adhesive may include applying a double-sided adhesive tape to the sheet material. The method may further include the step of removing a release liner from the double-sided adhesive tape.

The method may further include the step of folding leading ends of the lateral sections along a laterally-extending fold line to reveal a leading end of the center section before the step of applying adhesive to the center section.

The method may further include the limitation that the step (b) of attaching the center sections of the first supply and the second supply occurs before the step (c) of attaching the lateral sections of the first supply and the second supply.

The foregoing and other features of the invention are fully described herein and particularly pointed out in the claims, the following description and annexed drawings setting forth in detail one or more illustrative embodiments of the invention, these embodiments being indicative, however, of but a few of the various ways in which the principles of the invention may be employed.

DETAILED DESCRIPTION

Figure 1:
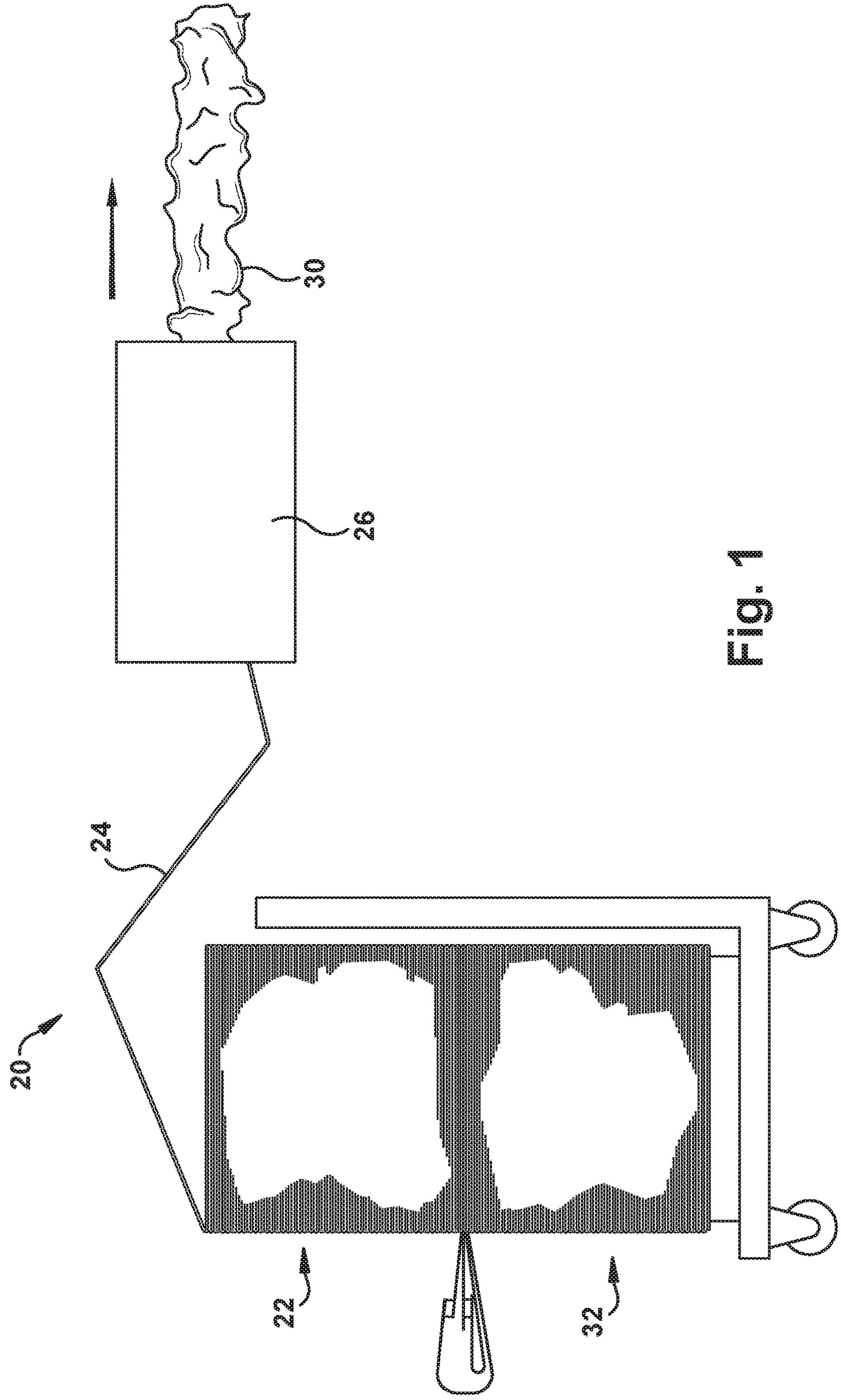
FIG. 1 is a schematic illustration of a dunnage conversion system, including a supply of sheet stock material provided by the invention and a dunnage conversion machine.
Figure 2:
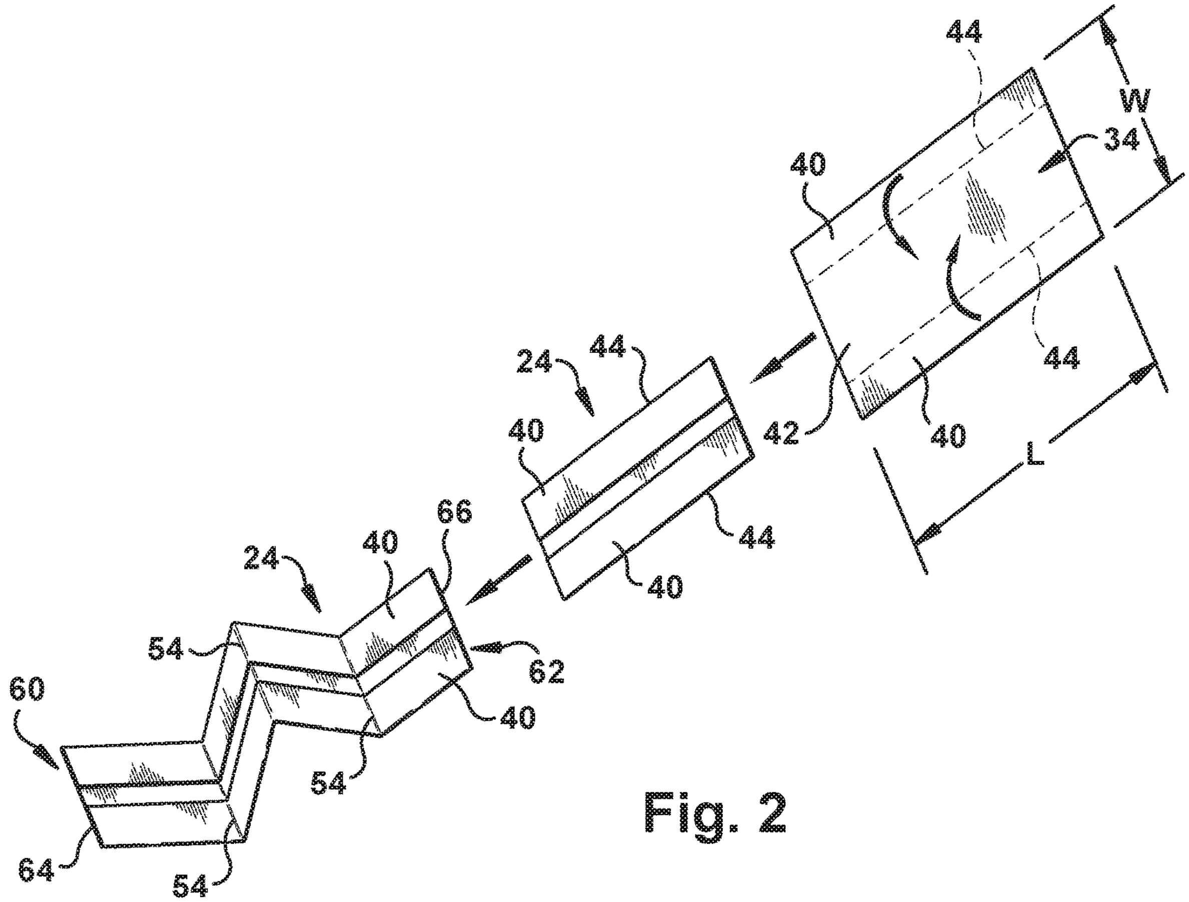
FIG. 2 is a schematic illustration of sequential steps in the production of the supply of sheet stock material.

Turning now to the drawings, and initially to FIG. 1, a dunnage conversion system 20 includes a supply 22 of C-fold sheet stock material 24 in accordance with the present invention and a dunnage conversion machine 26. The illustrated converter 26 draws the sheet stock material 24 from the supply 22 and converts the sheet stock material 24 into a dunnage product 30 that has a relatively lower density than the unconverted sheet stock material 24. Exemplary dunnage conversion machines are disclosed in U.S. Pat. Nos. 5,123,889; 5,607,383; and 6,015,374, each of which is hereby incorporated by reference.

The present invention provides a supply 22 of reduced-width, C-fold sheet stock material 24 for a dunnage conversion machine 26 that can be readily spliced to another supply 32 of sheet stock material 24, and a method for splicing sequential supplies 22 and 32 of such a sheet stock material together.

The C-fold sheet stock material 24 may include paper, such as kraft paper in various basis weights, or a plastic. Paper may be a preferred sheet stock material, since it is biodegradable, recyclable, and composed of a renewable resource. Turning to FIGS. 1 to 5, prior to imparting the C-fold, the sheet stock material has a sheet form as seen at 34, generally is very thin relative to the width (W), and has a length (L) much larger than the width (W), such that the thickness is negligible relative to either the width (W) or the length (L). This unfolded sheet stock material 34 may be substantially planar.

The sheet stock material 34 has several transversely-spaced, longitudinally-extending sections, including outer lateral sections 40 bounding a center section 42. The lateral sections 40 are inwardly folded, along longitudinal fold lines 44 at the lateral edges of the center section 42 and narrowing the overall width of the folded sheet stock material 24 compared to the unfolded sheet stock material 34. Laterally-outer longitudinal edges of respective lateral sections 40 of the sheet stock material are inwardly folded over a common face of the center section 42 and may meet at a longitudinal centerline, overlap across the longitudinal centerline, or may be spaced from the longitudinal centerline to leave a gap between the lateral sections 40, as shown. This folded sheet stock material 24 is referred to as C-fold sheet stock material.

Figure 4:
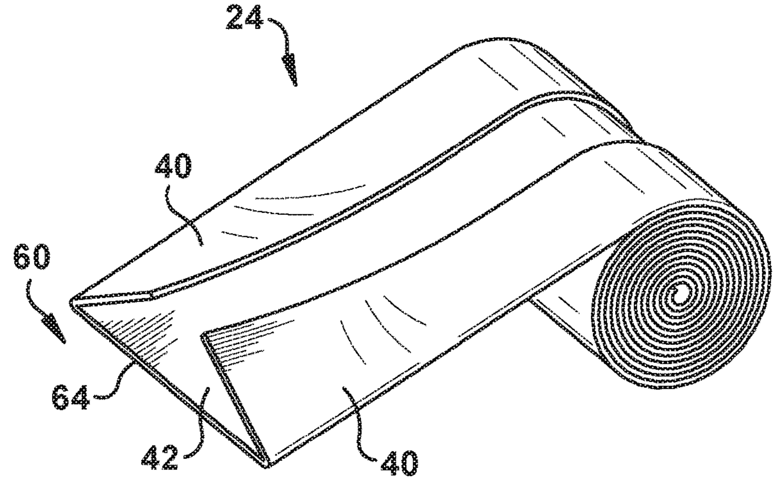
FIG. 4 illustrates a supply of sheet stock material provided by the invention in the form of a roll.
Figure 6:
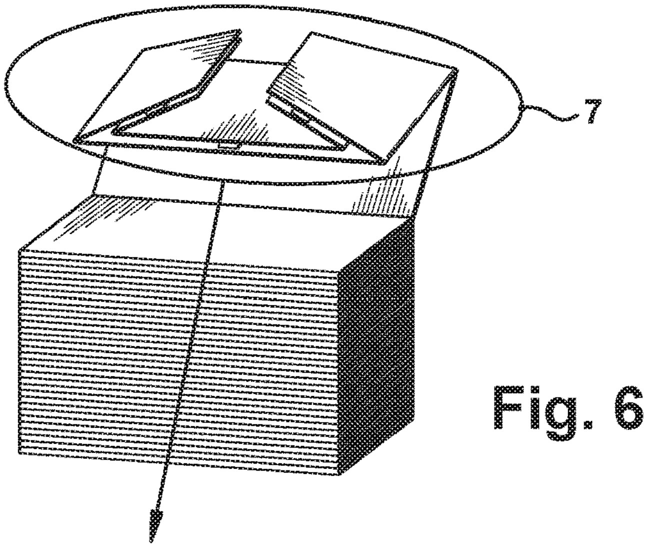
FIG. 6 is a perspective view of a supply of sheet stock material in the form of a fan-folded stack.
Figure 7:
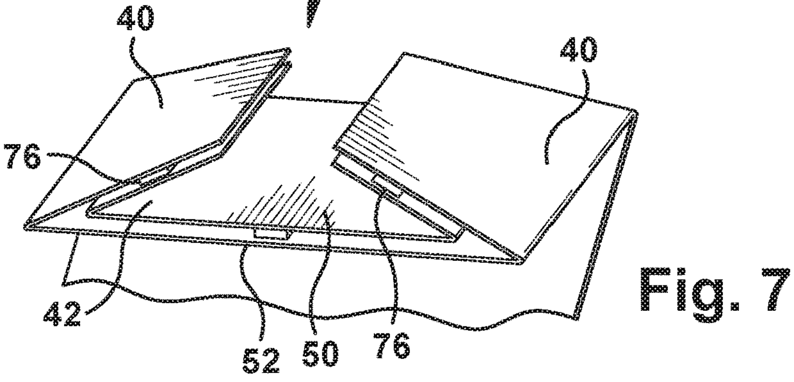
FIG. 7 is an enlarged view of a leading end of the sheet stock material of FIG. 6.
Figure 8:
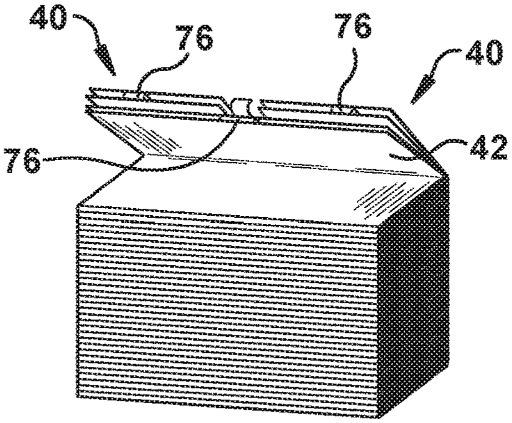
FIG. 8 is a perspective view of a supply of sheet stock material with longitudinal separation of lateral sections of the sheet stock material at a leading end.
Figure 9:
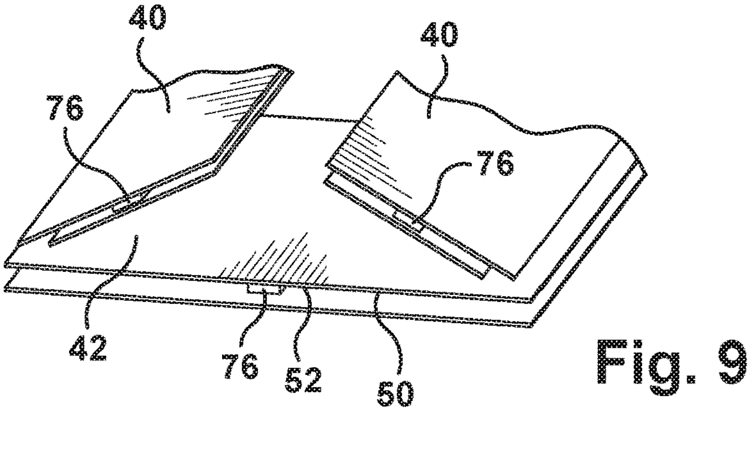
FIG. 9 is an enlarged view of a leading end of the sheet stock material of FIG. 8.
Figure 10A:
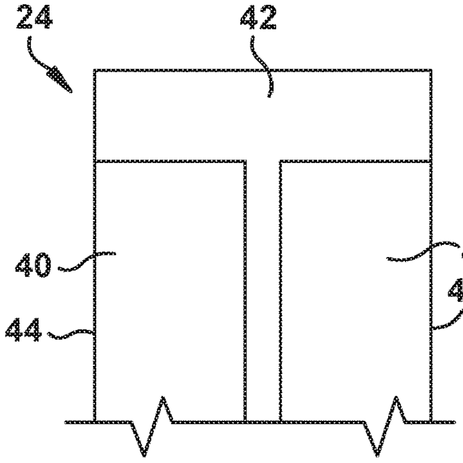
FIGS. 10A and 10B are top views of a leading end of the sheet stock material with lines of separation along longitudinal fold lines.
Figure 10B:
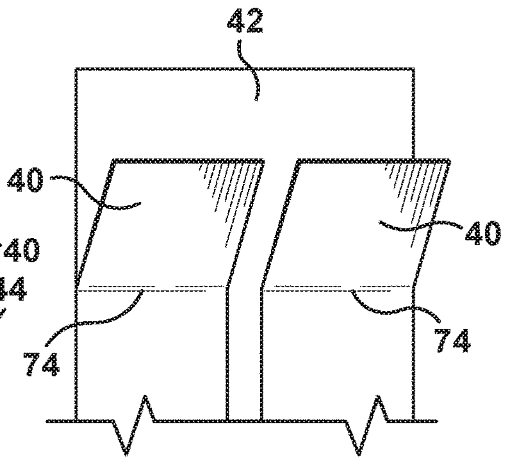

Depending on the needs and capabilities of the converter 26 and the desired characteristics of the resulting dunnage product 30, the sheet stock material may have one or more plies, and typically one to three plies, although one or two plies are most common. In a multi-ply configuration, one or more inner plies 50 of the C-fold sheet stock material 24 are nested inside adjacent outer plies 52. The sheet stock material may be supplied wound into a roll, as shown in FIG. 4, or fan-folded to form a rectangular stack, as shown in FIG. 6.

The C-fold sheet stock material may be fan-folded in a manner similar to that for conventional unfolded sheet stock material. To fan-fold the sheet stock material 24, the sheet stock material 24 also may be regularly folded along parallel lateral fold lines 54 in alternately-opposite directions at periodic, longitudinally-spaced intervals. The lateral fold lines 54 separate longitudinally-spaced segments or pages that are arranged in overlapping relationship to form a rectangular stack (FIG. 6) of fan-folded sheet stock material 24. The sheet stock material 24 also may be perforated along the lateral fold line 54, which may facilitate separating discrete dunnage products from the strip of dunnage along perforated fold lines.

Upon initial start-up, a leading end 60 of the sheet stock material 24 must be fed into the converter 26 to begin the dunnage conversion process. This initial loading process can be difficult and time-consuming. But once loaded and before the supply 22 is completely exhausted a trailing end 62 of the sheet stock material may be spliced to a leading end 60 of another supply 32 with minimal or no disruption of the operation of the converter 26 and the conversion process. When the converter 26 is once again operated, the trailing end 62 of the almost-spent supply 22 will pull the leading end 60 of the new supply 32 through the converter 26, effectively enabling refilling of the supply of sheet stock material so that the conversion process could continue indefinitely with minimal interruption for resupply.

In contrast to the prior unfolded sheet stock material, this C-fold sheet stock material 24 is not readily spliced by prior splicing techniques where lateral sections have not been inwardly folded. Due to the inwardly-folded lateral sections 40, prior splicing techniques do not work as well, if at all, without significant operator assistance. Splicing C-fold sheet stock material 24 can be particularly difficult for multi-ply configurations.

One solution has been to fold back the leading edges of the inwardly-folded lateral sections to expose inner layers, as shown in U.S. Patent Application Publication No. US 2017/0266907 A1. This folding technique can be difficult and time-consuming during the process of producing the supply of sheet stock material.

Figure 3:
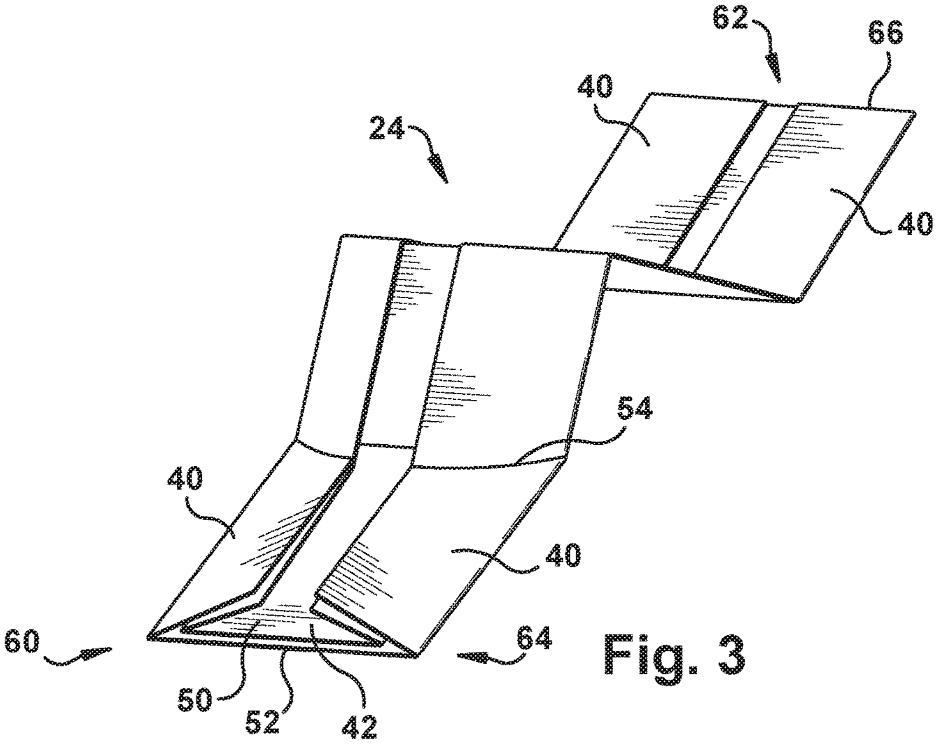
FIG. 3 is an enlarged perspective view of the sheet stock material.

The present invention provides alternative methods and an alternative supply 22 of C-fold sheet stock material 24 for a dunnage conversion machine 26 that is readily spliced to another supply 32 and is easy to produce. To this point, the supply 22 has been described as including one or more plies of sheet material 24 (two plies 50 and 52 are shown in FIG. 3) having (i) multiple longitudinal sections, including a center section 42 bounded by a pair of lateral sections 40, where the lateral sections 40 are folded inwardly over a common face of the center section 42 to form longitudinal fold lines 44 at lateral edges of the supply 22 of folded sheet material; and as shown (ii) a leading edge 64 at a leading end 60 and a trailing edge 66 at a trailing end 62 at longitudinally-opposite ends of the sheet material, where the lateral sections 40 are separated from the center section 42 at the leading edge 64 and at the trailing edge 66 extending away from the leading edge 64 and the trailing edge 66 along respective lines of separation for a distance that is less than the length (L) of the sheet stock material.

Figure 5:
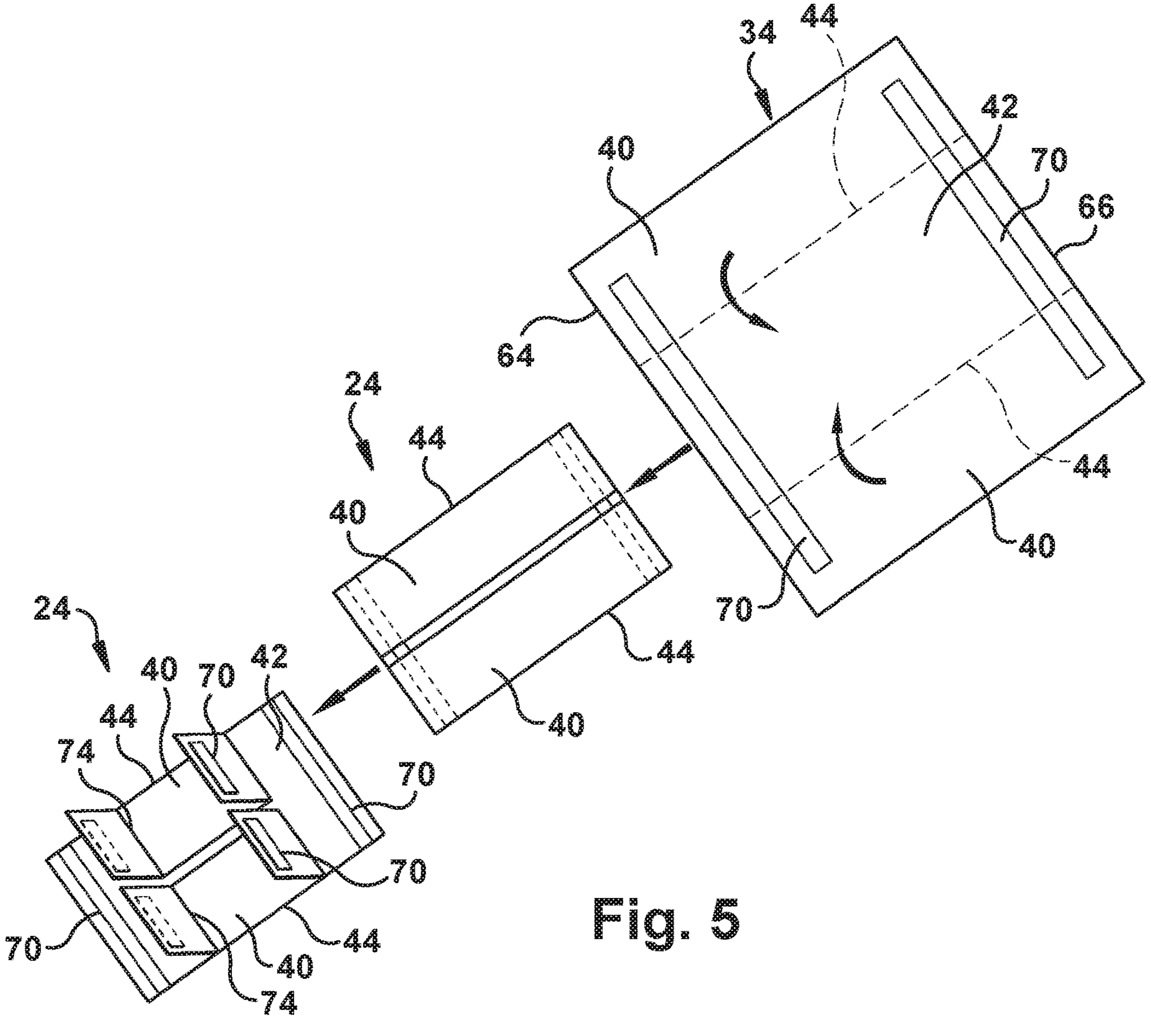
FIG. 5 is a schematic illustration of alternative sequential steps in the production of the supply of sheet stock material.

To effect the splice connection, a splicing adhesive 70 is applied to the sheet material adjacent the leading edge 64 or the trailing edge 66 on both the center section 42 and each of the lateral sections 40, or a combination thereof across both the leading end 60 and the trailing end 62, in such a manner as to facilitate splicing the supply 22 to another supply 32. The splicing adhesive 70 may be provided by a double-sided tape, one side of which may be secured to the sheet material and the other side of which may be covered by a removable release liner. The pre-applied double-sided tape, or other adhesive, may be secured to the leading end 60 of the second supply 32 or the trailing end 62 of the first supply 22, or a combination thereof, such as on the leading end 60 of the lateral sections 40 of the first supply 22 and on the trailing end 62 of the central section 42 of the second supply 32. The splicing adhesive 70 may be provided to the sheet stock material before folding, as shown in FIG. 5, or after the lateral sections 40 have been separated from the center section 42.

The lateral sections 40 are separated from the center section 42 along the line of separation for a distance far enough to facilitate folding back portions of the lateral sections 40 adjacent the leading end 60 and the trailing end 62 a sufficient distance to reveal a sufficient length of the center section 42 to provide access for a splicing adhesive 70, approximately one-quarter to one-eighth of the distance between lateral fold lines 54 in a fan-folded sheet stock material, which is typically at least one centimeter, up to a distance of about fifteen centimeters. The sheet stock material may be cut, such as with a knife, torn, or otherwise operated on to separate each of the lateral sections 40 from the center section 42 such that the lateral sections 40 can be folded away from the center section 42 independent of the center section 42 to facilitate splicing and the application of the splicing adhesive 70.

Figure 11A:
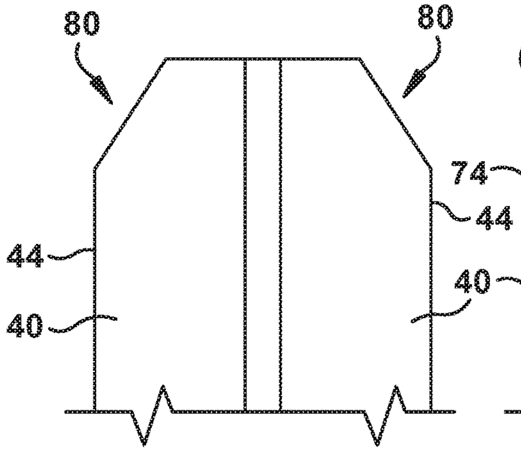
FIGS. 11A and 11B are top views of a leading end of the sheet stock material with lines of separation formed by a diagonal cut across the longitudinal fold line at a leading end of the sheet stock material.
Figure 11B:
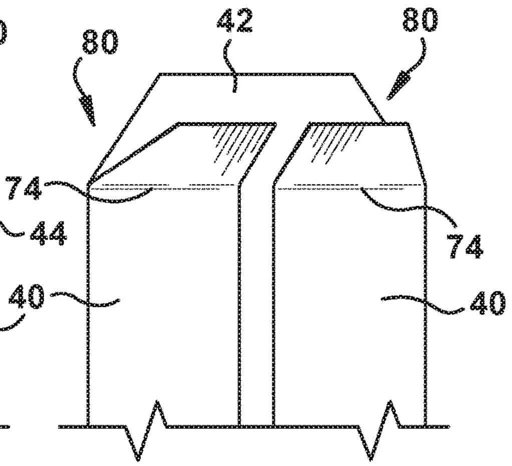
Figure 12A:
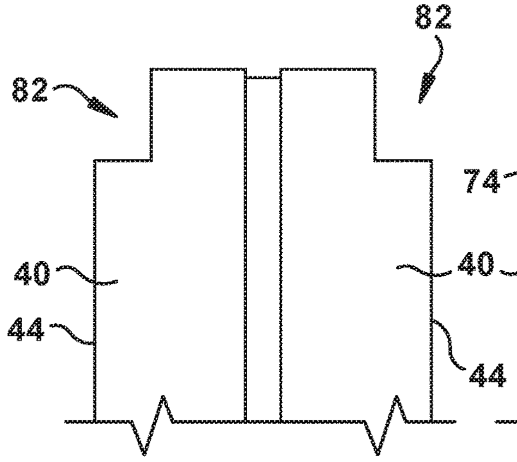
FIGS. 12A and 12B are top views of a leading end of the sheet stock material with lines of separation formed by a rectangular notch across the longitudinal fold line at a leading end of the sheet stock material.
Figure 12B:
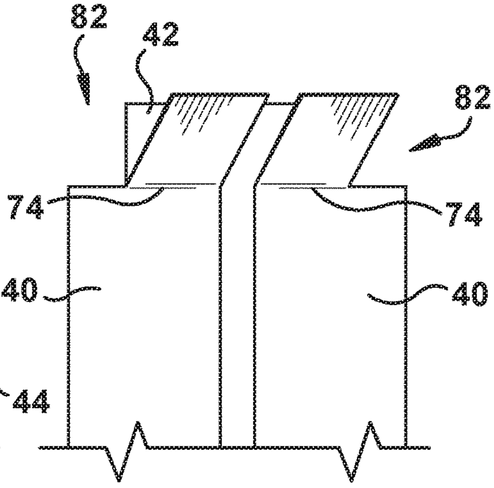

The lines of separation may extend parallel to, follow, or extend transverse to respective longitudinal fold lines 44. The line of separation also may take the form of a chamfer 80 (FIGS. 11A and 11B) or a notch 82 (FIGS. 12A and 12B) in the end of the lateral sections 40 adjacent an end 60 or 62 of the sheet stock material and across a longitudinal fold line 44. The leading and trailing ends 60 and 62 of the C-fold stock material 24, or just the lateral sections 40, also may be cut to one-half to one-eighth of the distance between lateral fold lines 54 to form a shorter "page" that may be easier to splice.

A transverse fold line 74 may be formed in each of the lateral sections 40 between the leading or trailing edges 64 and 66 and an end of a respective line of separation removed from the nearest leading or trailing edge 64 and 66. This transverse fold line 74 allows the lateral section 40 to be folded back to reveal the underlying center section 42. The transverse fold lines 74 in respective adjacent lateral sections 40 may be aligned, parallel, or transverse one another.

Accordingly, the splicing adhesive 70 may be applied to the sheet stock material after the lines of separation are formed. Prior to applying the splicing adhesive 70, transverse fold lines 74 may be formed in each of the lateral sections 40 to facilitate access to the center section 42 underlying the lateral sections 40 adjacent the leading and trailing ends 60 and 62. These transverse fold lines 74 may be but are not necessarily perpendicular to the longitudinal fold lines 44 and the transverse fold lines 74 in adjacent lateral sections 40 may be aligned, parallel, or transverse each other.

In a multi-ply configuration, the supply 22 also includes a ply adhesive 76 or other connection mechanism to connect the plies 50 and 52 together adjacent each of the leading edge 64 and the trailing edge 66 on both the center section 42 and each of the lateral sections 40, and more particularly to connect the lateral and center sections 40 and 42 of each ply 50 and 52 to a corresponding section of an adjacent ply. Connecting the plies 50 and 52 ensures that each ply will be pulled into the converter 26 when needed.

Figure 13:
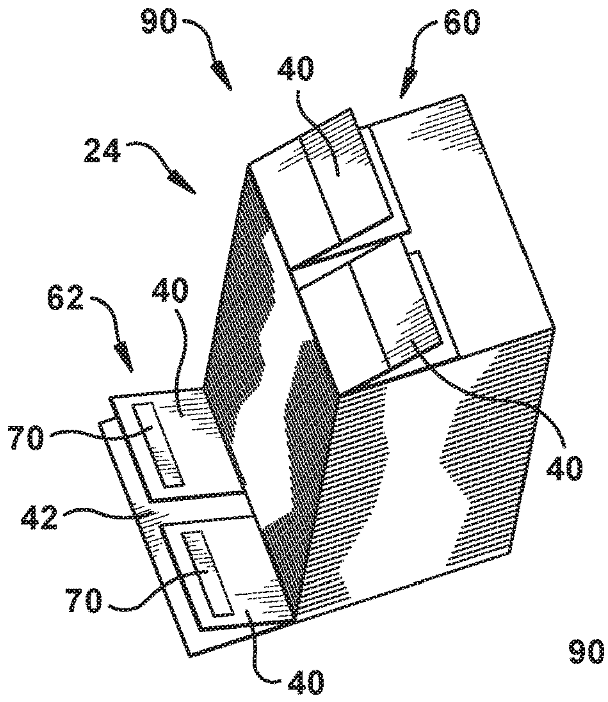
FIG. 13 is a perspective view of a stack of fan-folded sheet stock material with a trailing end unfolded to extend from under the stack.
Figure 14:
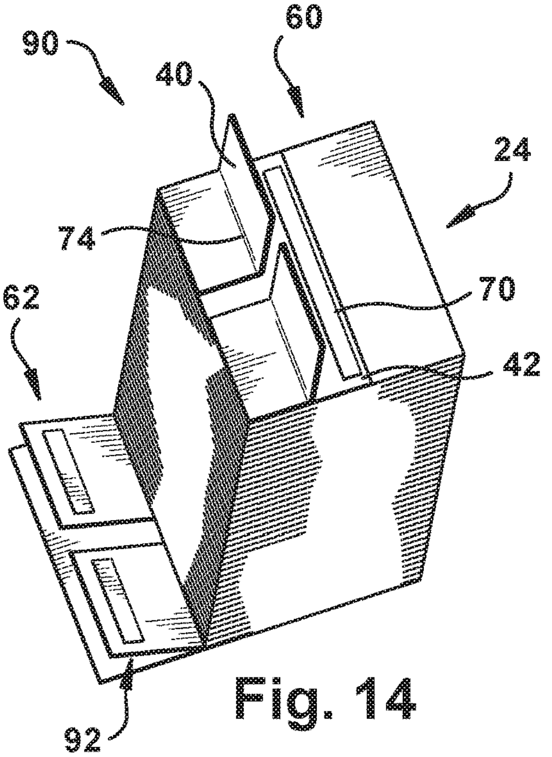
FIG. 14 is a perspective view of the stack of FIG. 13 with lateral sections of leading ends folded back to show a center section.
Figure 15:
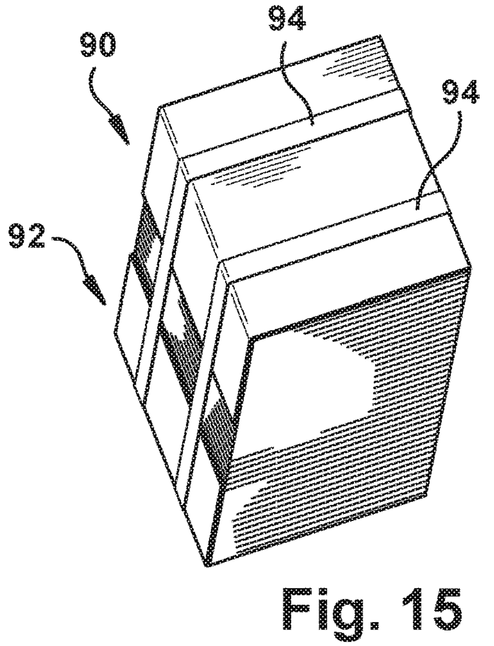
FIG. 15 is a perspective view of a bundled, fan-folded sheet stock material.
Figure 16:
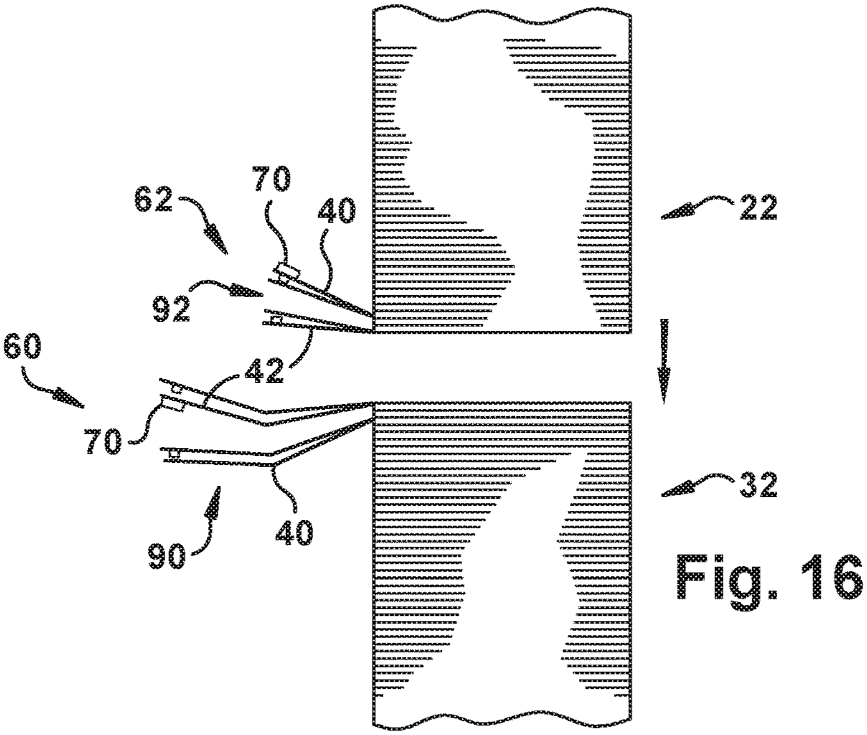
FIG. 16 is a schematic elevation view of two supplies of sheet stock material being brought together for splicing.
Figure 17:
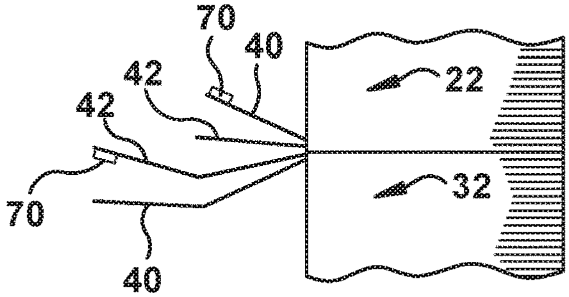
FIGS. 17 to 19 are schematic elevation views of two stacks of sheet stock material with leading and trailing ends of respective stacks being spliced together.

In a completed fan-folded stack supply 22 of sheet stock material, as shown in FIGS. 13-15, adjacent the leading end 60 of the sheet material, a leading end segment 90 may be folded along the nearest lateral fold line 54 to extend down a side of the stack, and adjacent the trailing end 62 of the sheet material a trailing end segment 92 may be folded along the nearest lateral fold line 54 to extend up the same side of the stack. One or more bailing straps 94 may be provided to hold the leading and trailing segments 90 and 92 against the side of the stack. The straps 94 also may help to maintain the stack in a compact configuration for its own shipment or for storage until ready for use.

Thus, production of the supply 22 of C-fold sheet stock material 24 includes the steps of inwardly folding the lateral sections 40 in a common direction over a common face of the center section 42. The lines of separation may be formed, such as by cutting or tearing, for example, the sheet stock material 24 adjacent to and extending to or from the leading and trailing edges 64 and 66, thereby separating each of the lateral sections 40 from the center section 42 along respective lines of separation. The resulting C-fold sheet stock material 24 is wound into a roll, or fan-folded along longitudinally-spaced transverse fold lines 54 and accordion-folded about those fold lines 54 to form a rectangular stack. Leading and trailing segments 90 and 92 may be folded about respective transverse fold lines 54 over a common side of the stack, and one or more bailing straps 94 may be wrapped around the stack, or the roll, to maintain its compact configuration, ready for use, including splicing. The lines of separation may be formed before the sheet stock material is wound into a roll or fan-folded into a stack, or after the sheet stock material is folded into a stack, and before the stack or roll is bound with bailing straps 94. The use of bailing straps is advantageous to keep the sheet stock material together but is optional.

Referring now to FIGS. 16 to 19, to use the supply 22 of sheet stock material or to splice two supplies 22 and 32 of C-fold sheet stock material 24, the bailing straps 94 (FIG. 15), if any, are removed from one or each supply 22 and 32 of C-fold sheet stock material. Two sequential supplies of C-fold sheet stock material 24, which may be referred to as the first or leading supply 22 and the second or following supply 32, are placed next to each other, such as in a vertical stack, with respective leading and trailing end 60 and 62 of the supplies 22 and 32 placed adjacent one another and the leading end segments 90 and the trailing end segments 92 (FIG. 16) extending in a common direction.

Figure 18:
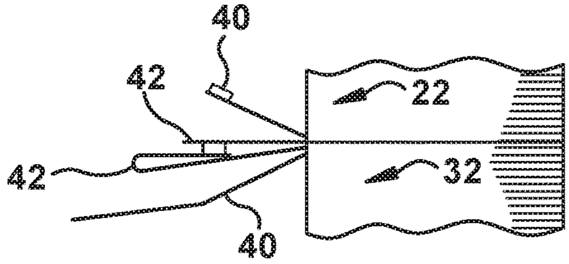
Figure 19:
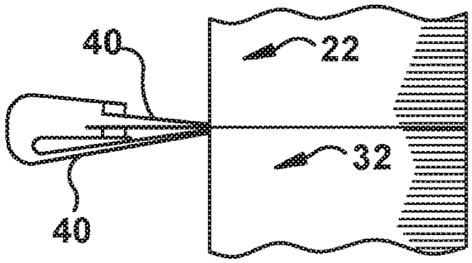

To begin splicing in an exemplary method, release liners are removed from respective pre-applied segments of double-sided tape or other splicing adhesive 70 that is provided on respective center sections 42. The leading end 60 of the central section 42 of the second supply 32 is attached to a trailing end 62 of the central section 42 of the first supply 22 (FIG. 18). Then the release liner is removed from a pre-applied double-sided tape from or other splicing adhesive 70 that is provided on the lateral sections 40, and leading ends 60 of the lateral sections 40 of the second supply 32 are attached to respective lateral sections 40 of the first supply 22 (FIG. 19). A leading end 60 (not shown) of the first supply 22 may be fed into a dunnage conversion machine 26 (FIG. 1), before or after splicing, and the splicing will allow the dunnage conversion machine 26 to pull the leading end 60 of the sheet stock material 24 from the second supply 32 via the trailing end 62 of the first supply 22 as the first supply 22 is depleted.

Accordingly, the present invention also provides a corresponding method for splicing sequential supplies of such C-fold sheet stock material for a dunnage conversion machine. An exemplary method includes the following steps: (a) providing first and second supplies of sheet stock material, each with one or more plies of sheet material having (i) multiple longitudinally-extending sections, including a center section bounded by lateral sections, where the lateral sections are folded over a common face of the center section to form longitudinal fold lines at lateral edges of the folded sheet material, and (ii) a leading edge and a trailing edge at respective longitudinally-opposite ends of the sheet material, where the lateral sections are separated from the center section adjacent both the leading edge and the trailing edge along respective lines of separation; (b) attaching a trailing end of the center section of the first supply, where the trailing end is adjacent the trailing edge, to a leading end of the center section of the second supply, where the leading end is adjacent the leading edge, and (c) attaching a trailing end of each lateral section of the first supply to respective leading ends of the lateral sections of the second supply.

The method may further include the step of placing the first supply adjacent the second supply, such as by stacking the first supply on top of the second supply, before the attaching steps.

The method may include the step of connecting multiple plies in the first supply together and connecting multiple plies in the second supply together in the center section of each supply and in each of the lateral sections of each supply adjacent both the leading edge and the trailing edge before the attaching steps.

The method may further include the step of applying a splicing adhesive to the sheet material adjacent at least one of the leading edge or the trailing edge and on both the center section and each of the lateral sections for one of or a combination of the first supply and the second supply. The step of applying an adhesive may include applying a double-sided adhesive tape to the sheet material. The double-sided adhesive tape or other splicing adhesive generally is applied to the sheet stock material in advance, by the manufacturer of the supply of sheet stock material. Double-sided tape generally has its exposed, non-adhered outer surface covered by a removable release liner until ready for splicing. Accordingly, the method may further include the step of removing a release liner from the double-sided adhesive tape before splicing.

The method also may include the step of folding leading ends of the lateral sections along a laterally-extending fold line between respective lines of separation to reveal a leading end of the center section, and this folding step may occur before the step of applying adhesive to the center section.

The step (b) of attaching the center sections of the first supply and the second supply may occur before or after the step (c) of attaching the lateral sections of the first supply and the second supply.

In summary, the present invention provides the foregoing splicing method and a supply 22 of C-fold sheet stock material 24 for a dunnage conversion machine 26 that is readily spliced to another supply 32. The supply 22 and 32 provided by the present invention includes (a) one or more plies 50 and 52 of sheet material having (i) multiple longitudinally-extending sections, including a center section 42 bounded by lateral sections 40, where the lateral sections 40 are folded over a common face of the center section 42 to form longitudinal fold lines 44 at lateral edges of the folded sheet material, and (ii) a leading edge 64 and a trailing edge 66 at respective longitudinally-opposite ends of the sheet material, where the lateral sections 40 are separated from the center section 42 adjacent the leading edge 64 and adjacent the trailing edge 66 along respective lines of separation; and (b) a splicing adhesive 70 applied to the sheet material adjacent the leading end 60 or the trailing end 62 on both the center section 42 and each of the lateral sections 40 to facilitate splicing each section 40 and 42 to respective sections 40 and 42 of the two supplies 22 and 32.

As discussed above, as a supply of sheet stock material is exhausted, or to connect multiple supplies of sheet stock material together to form a larger contiguous supply of sheet stock material, the trailing end of a leading supply of sheet stock material may be spliced to a leading end of a following supply of sheet stock material.

This process can be repeated indefinitely to provide an effectively infinite supply.

Several additional techniques for splicing C-fold fan-fold stock material have been developed that do not require cutting the stock material in the manner described above. Several exemplary cut-free splicing techniques will be described with reference to FIGS. 20-32. These techniques also may apply to multi-ply C-fold sheet stock material.

As will be further explained below, the first step in splicing C-fold sheet stock material is to insert a trailing end portion of a leading supply of C-fold sheet stock material inside the leading end portion of a following supply of C-fold sheet stock material. In other words, the trailing end of a leading supply is inserted between the corresponding center portion and the folded-over lateral portions at a leading end portion of the trailing supply of C-fold sheet stock material. This also can be referred to as a telescoping engagement. The leading and trailing end portions are then secured together to complete the splice.

If the C-fold sheet stock material is provided in a roll, the trailing end of the sheet stock material is not accessible until the trailing end comes free. Then a leading end of a new roll can be spliced to the trailing end.

As shown in FIGS. 20 to 26, if the C-fold sheet stock material is provided in a fan-fold stack, multiple fan-fold stacks can be spliced together without waiting for a first stack to be nearly depleted. The trailing end of the stack is immediately accessible at a bottom side of the stack.

Figure 20:
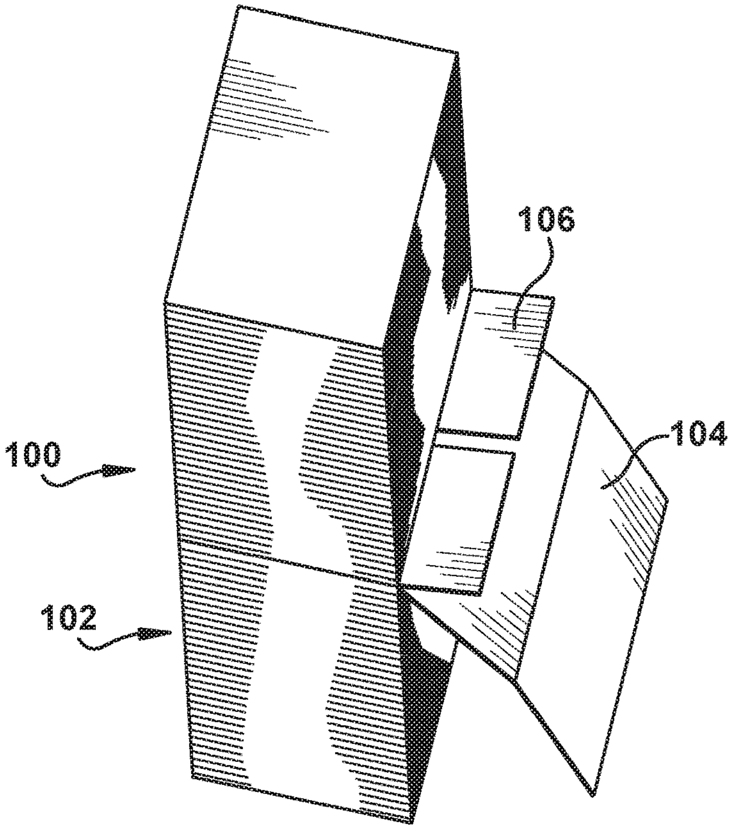
FIGS. 20 to 23 are schematic perspective views of two stacks of sheet stock material with leading and trailing ends of respective stacks being spliced together.
Figure 21:
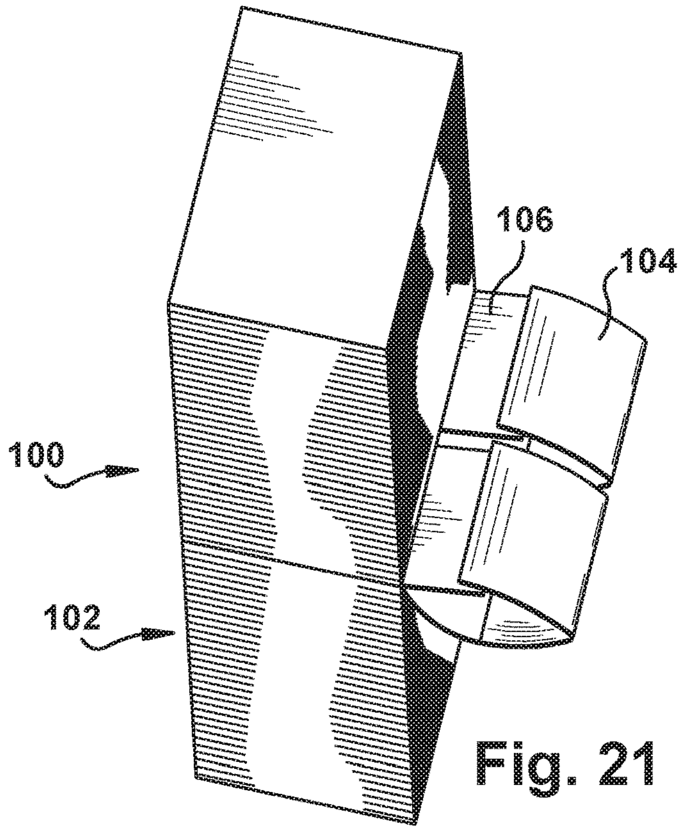

First, any bailing straps are removed from one or each supply, specifically each stack, of C-fold sheet stock material. Two sequential stacks of C-fold sheet stock material, which may be referred to as the first or leading stack or supply 100 and the second or following stack or supply 102, are placed next to each other, such as in a vertical stack. A leading end 104 of the following stack 102, on the bottom in the illustrated arrangement, is drawn from the top of the following stack 102 so that it extends from one side of the stack 102 and is accessible. The leading fan-fold stack 100 is placed adjacent, such as on top of, the following fan-fold stack 102. A trailing end 106 of the leading fan-fold stack 100 can be pulled from the bottom of the leading stack 100 so that it extends from one side of the stack prior to or after stacking, or the trailing end can be secured to the side of the stack during production. (FIG. 20).

The trailing end can be secured to the side of the stack with strapping for transport and storage. Upon removal of the strapping the trailing end is released from the side of the stack such that it extends outwardly on that side of the stack. The trailing end 106 of the leading fan-fold stack 100 can be unfolded from its position adjacent the side of the leading stack 100 to facilitate inserting the trailing end 106 of the leading fan-fold stack 100 inside the leading end 104 of the following fan-fold stack 102. See FIGS. 21 and 24. More specifically, the trailing end 106 of the leading stack 100 is inserted between the folded-over lateral portions 110 and 112 and the central portion 114 of the leading end 104 of the following stack 102. Then the trailing end 106 of the leading stack 100 and leading end 104 of the following stack 102 are secured together to complete the splice.

There are several ways to secure the leading supply and the following supply together. One approach is simply to apply an adhesive tape. The adhesive tape is made of a base or backing material with adhesive on a front side of the backing. The front side of the backing has adhesive at least adjacent the long edges, but may be completely covered by adhesive. A rear side of the backing opposite the front side is free of adhesive.

Figure 22:
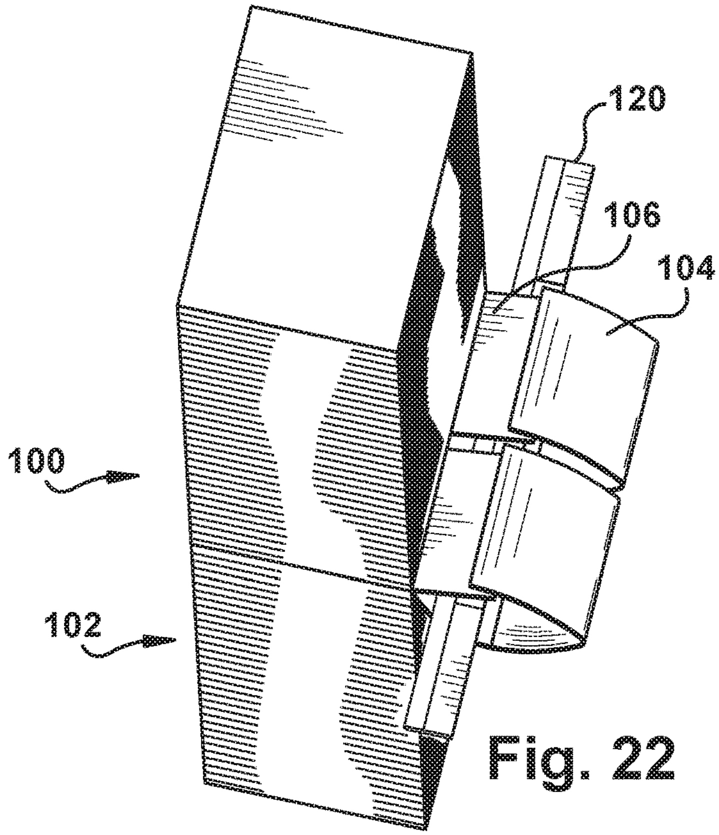
Figure 23:
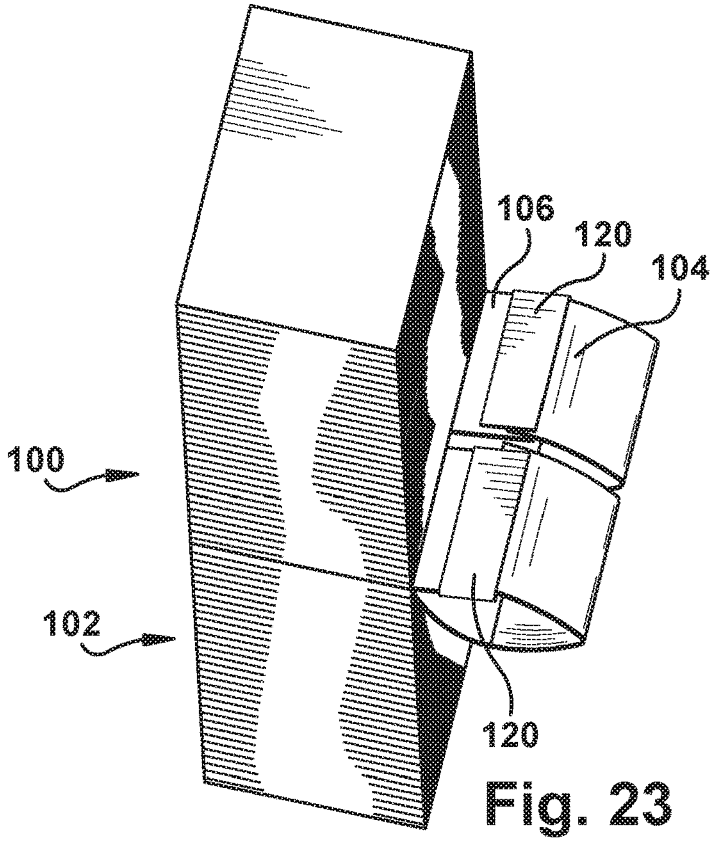

A continuous strip of adhesive tape may be secured to the outside of the overlapping C-fold sheets to secure them together. For example, a length of adhesive tape can be extended behind the overlapping C-fold sheets to couple respective center portions together. Then the tape can be wrapped around and secured to respective pairs of lateral portions, as shown in FIGS. 22 and 23. Alternatively, the tape can be secured to one pair of lateral portions, then the center portions, and then the other pair of lateral portions.

Figure 25:
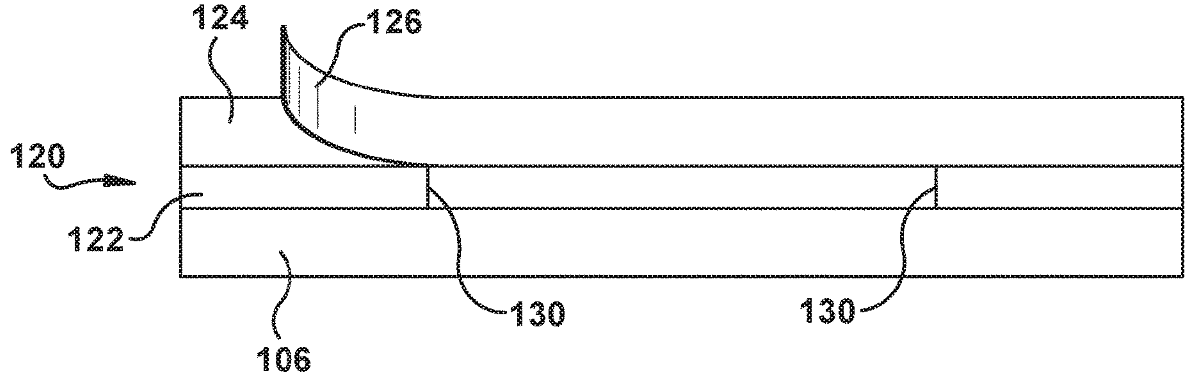
FIG. 25 is a plan view of an exemplary continuous length of adhesive tape with release liners.
Figure 26:
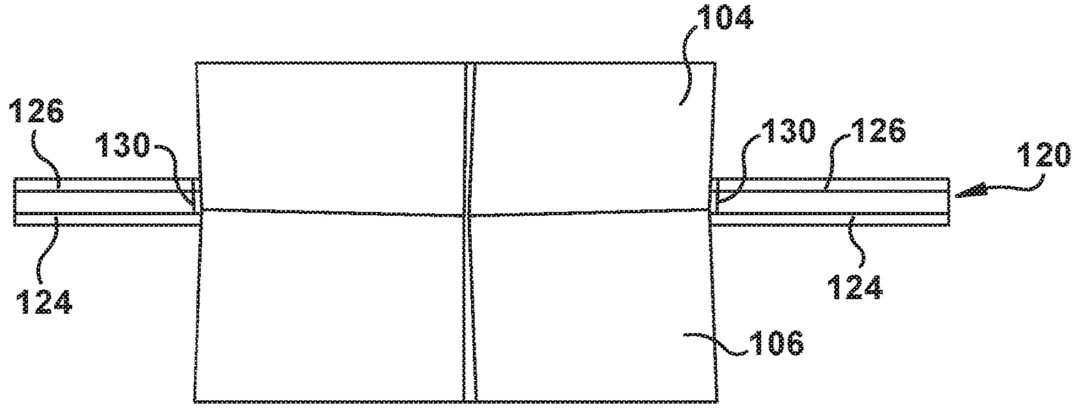
FIG. 26 is a plan view of the sheet stock material of FIG. 24 in the process of being spliced with the adhesive tape of FIG. 25.

Another approach is to use an adhesive tape with selectively-removeable release liners covering the adhesive on the backing until ready for use. An exemplary adhesive tape 120 of this type is shown in FIG. 25. The adhesive tape includes a backing 122 with parallel longitudinally-extending strips of adhesive 124 (one shown) covered by respective ones of a pair of longitudinally-extending release liners or linings 126. If the backing 122 is completely covered with adhesive, a pair of release liners each may cover half of the front side. The adhesive and release liners may extend across the width of the backing, or may be separated in parallel lines in the manner shown so that the release liners 126 and the adhesive 124 underneath are spaced apart. Separating the parallel release liners 126 may facilitate removing individual release liners 126, one at a time.

Figure 24:
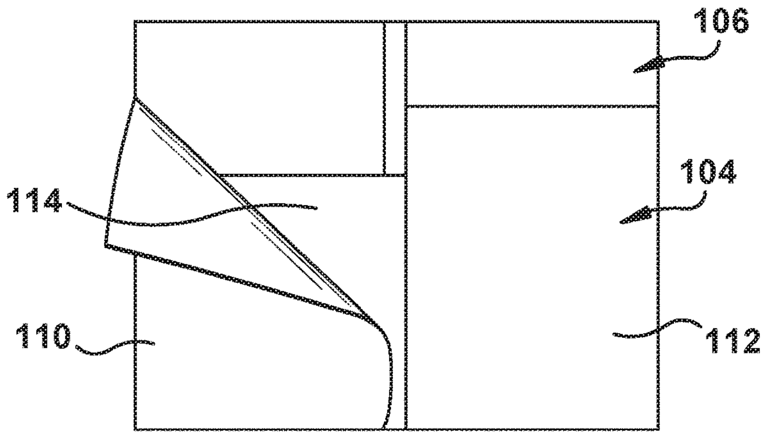
FIG. 24 is a schematic plan view of a trailing end of a leading supply of sheet stock material inserted into a leading end of a following supply of sheet stock material to be spliced together.

The adhesive tape can be continuous, sufficient to extend from one lateral portion, across a back side of the central portion and around to the other lateral portion of the C-fold sheet stock material. With release liners, each release liner can be one continuous strip as well. The adhesive tape may include indicia 130, as shown in the exemplary adhesive tape 120 of FIG. 25, positioned to facilitate registering a length of adhesive tape, whether provided with release liners or not, to help register the tape with one or both edges of the C-fold sheet stock material at the longitudinally-extending fold lines separating the central portion 114 of the C-fold sheet stock material from the lateral portions 110 and 112 (FIG. 24).

The release liners 126 are removed as needed to secure the adhesive tape 120 to the sheet stock material. For example, one release liner 126 may be removed, and the exposed adhesive 124 on the adhesive tape 120 may be secured to one of the leading and trailing ends of the leading (preceding) and following (trailing) supplies of C-fold sheet stock material. Then the other release liner 126 can be removed to secure the adhesive tape 120 to the other of the leading and trailing ends of the leading and following supplies of C-fold sheet stock material.

Figure 27:
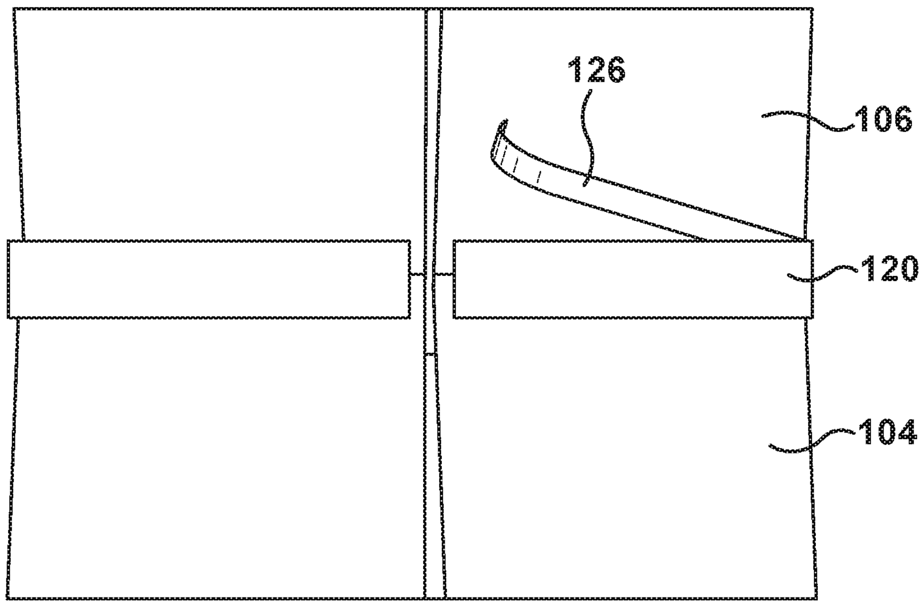
FIG. 27 is a schematic plan view of the leading end of the sheet stock material shown in FIG. 26 further in the process of being spliced to a trailing end of a leading supply of sheet stock material.

An operator may remove one of the release liners 126 from the adhesive tape 120 of FIG. 25 and secures the exposed adhesive 124 and the adhesive tape 120 to a central portion of the trailing end 106 of the leading supply 100 (FIG. 22) or alternatively the leading end 104 of the following supply 102. The operator then wraps the ends of the adhesive tape 120 around the lateral portions of the trailing end 106 to secure the adhesive tape 120 to those portions of the C-fold sheet stock material. The operator then removes the other release liner 126 from between the adhesive 124 and the other of the leading end 104 of the following supply 102 or the leading end 104 of the following supply, such as shown in FIG. 27 to secure the adhesive tape 120 across the intersection of the leading end 104 of the following supply 102 and the trailing end 106 of the leading supply 100.

Figure 28:
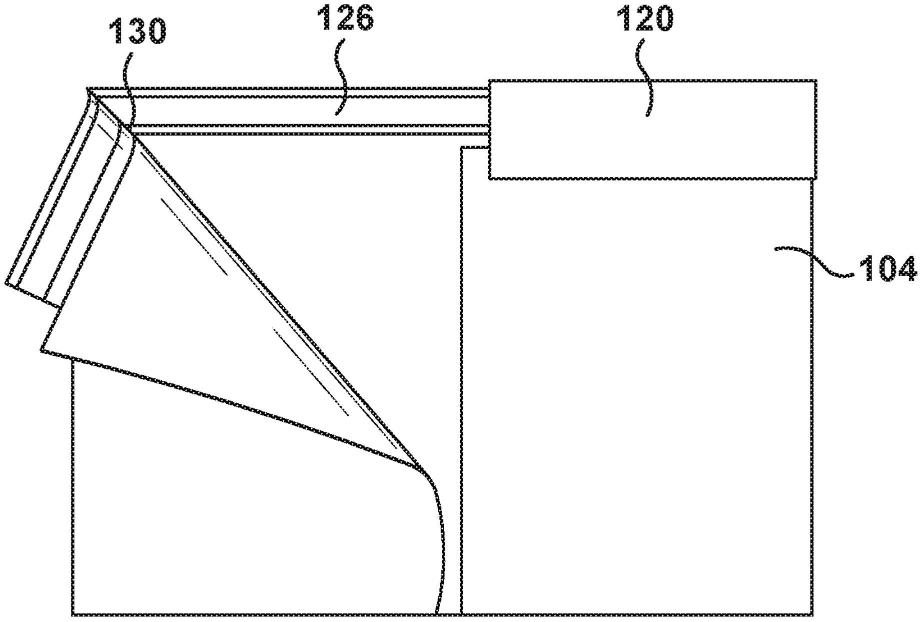
FIG. 28 is a schematic view of a leading end of sheet stock material with a continuous length of adhesive tape.

An advantage of separate release liners is that the adhesive tape can be secured to the leading end 104 of a supply of sheet stock material during production of the C-fold sheet stock material. The adhesive tape applied to the C-fold sheet stock material also may be referred to as a splice tag. With the adhesive tape 120 pre-applied to a leading end of the supply of C-fold sheet stock material during production thereof, such as is shown in FIG. 28, the end user only has to remove one release liner 126. When the end user is ready to splice a leading supply 100 to a following supply 102, the trailing end 106 of the leading supply 100 is telescopically inserted inside the leading end 104 of the following supply 102 (FIG. 24). Since the leading end 106 already has adhesive tape 120 affixed, the end user only needs to remove the remaining release liner 126 from the splice tag before securing the adhesive tape 120 to the respective trailing end 106 of the leading supply 100 to complete the splice.

Another approach is to provide shorter discrete segments of adhesive tape, which then may be used to secure the central portions of the leading and following supplies, or the lateral portions or a combination thereof. Release liners from each segment of adhesive tape can be removed one at a time to secure respective sections of the leading supply and the following supply of C-fold sheet stock material, either during production or by the end user.

Figure 29:
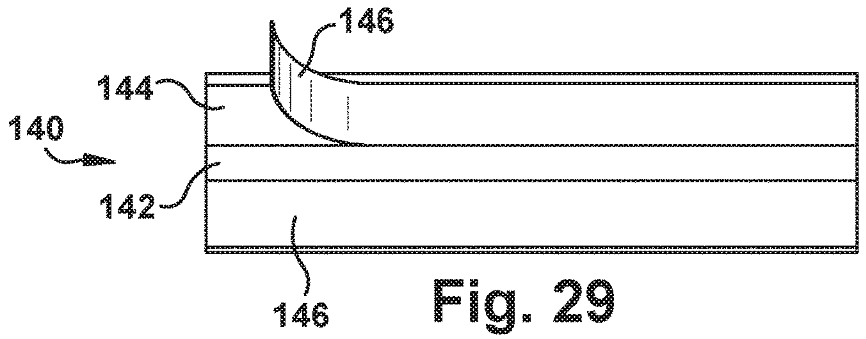
FIG. 29 is another plan view of an exemplary adhesive tape with release liners.

An exemplary segment of adhesive tape 140 is shown in FIG. 29. The segment of adhesive tape 140 generally is identical to the longer adhesive tape 120 described above. This shorter segment of adhesive tape 140 is not long enough to span the full distance from one lateral portion, across the central portion to the other lateral portion of the C-fold sheet stock material. Consequently, the segment of adhesive tape 140 generally would not include indicia for registering the segmented adhesive tape relative to fold lines in the C-fold sheet stock material unless the segment of adhesive tape were to be applied across just two sides, from the lateral portion to the central portion, in which case indicia may be employed in this adhesive tape 140 as well. The adhesive tape 140 thus includes a backing 142, longitudinally-extending adhesive 144, and a pair of longitudinally-extending release liners 146.

Figure 30:
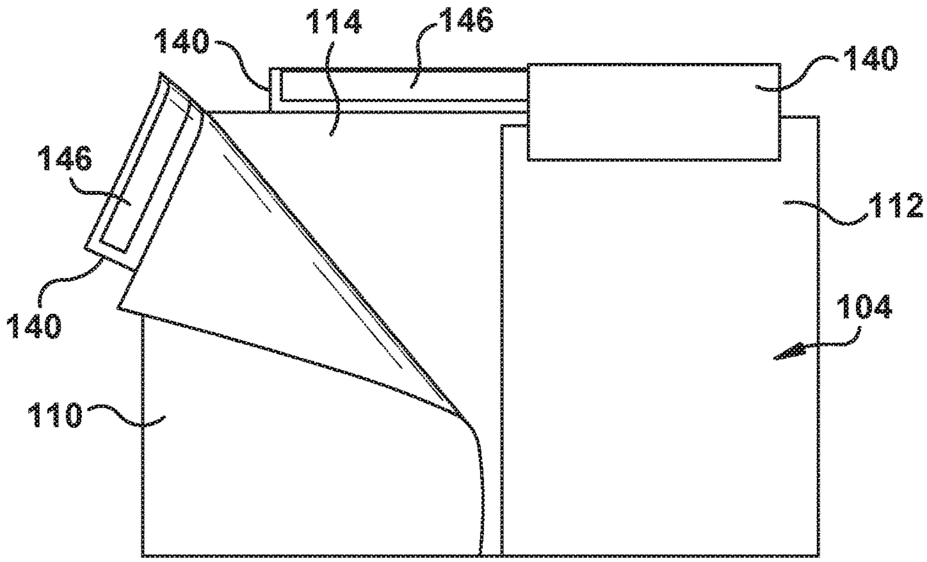
FIG. 30 is a schematic view of a leading end of sheet stock material with discrete segments of adhesive tape applied to each of a center section and a pair of lateral sections.

As shown in FIG. 30, such segments of adhesive tape 140 may be secured to the leading end 104 of a following supply of C-fold sheet stock material, to form splice tags secured to each of the lateral portions 110 and 112 and the central portion 114 of the C-fold sheet stock material as shown.

Figure 31:
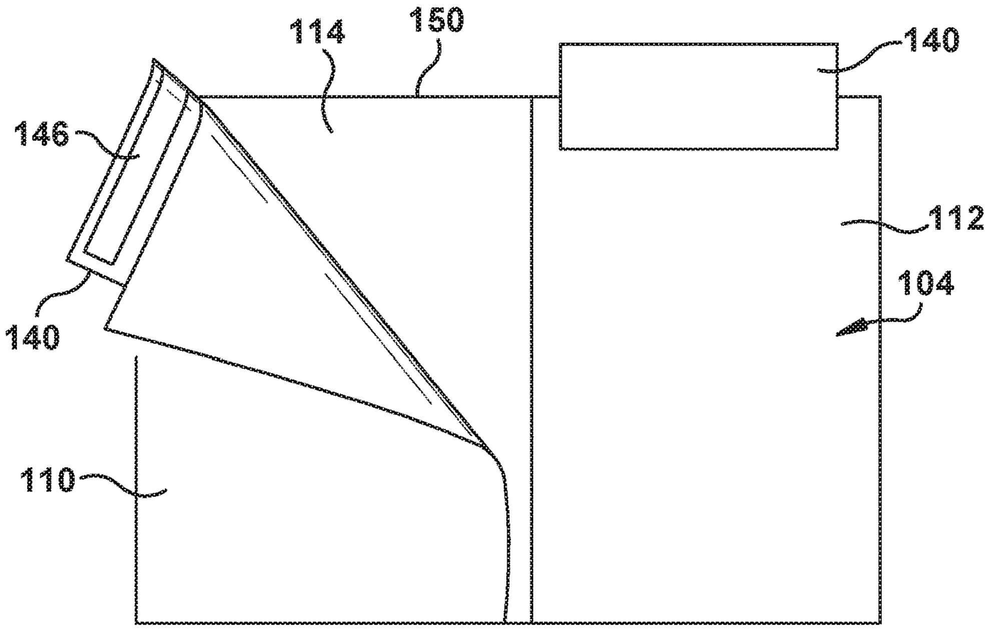
FIG. 31 is a schematic view of a leading end of sheet stock material with discrete segments of adhesive tape applied to each of a pair of lateral sections only.

Yet another approach that has been found to be successful is to provide discrete segments of such adhesive tape 140 only on the lateral portions 110 and 112, as shown in FIG. 31. The central portion 114 is left free of adhesive tape. This allows the end user to splice leading and following supplies of C-fold sheet stock material from one side, without having to reach around to a back side of the C-fold sheet stock material to connect the center sections. And if the splice tags are pre-applied, the end user only has to remove two release liners. This splicing operation is quicker and surprisingly has been found to provide a satisfactory connection between the leading end 104 of the following supply 102 and the trailing end 106 of the leading supply 100. This is believed to be because pulling the spliced leading and trailing ends 104 and 106 into a conversion machine applies tension to the C-fold sheet stock material, but that tension is applied primarily to the lateral portions 110 and 112.

Not securing the central portions 114 may not initially seem to be a good idea. Remember that the trailing end 106 of the leading supply 100 extends inside the leading end 104 of the following supply 102. As a result, when the leading end 104 of the following supply 102 is drawn into the conversion machine the leading edge 150 (FIG. 31) of the leading end 104 is exposed in the central portion, the trailing end 106 of the leading supply 100 is nested inside the trailing end 104 (FIG. 24). This leading edge 150 would be expected be more likely to catch on elements of the conversion machine. In practice, however, this has not been a significant problem, contrary to initial expectations.

To prepare a supply of ready-to-splice C-fold sheet stock material with short segments of adhesive tape 140, a first release liner 146 (FIG. 29) is removed from a splice tag 140 and exposed adhesive 144 on the splice tag 140 is secured to a lateral portion 110 or 112 at a leading end 104 of the C-fold sheet stock material such that a second release liner 146 lies beyond or extends beyond the leading edge of the C-fold sheet stock material. The second release liner 146 is left in place until removed by the end user during a splicing operation.

Figure 32:
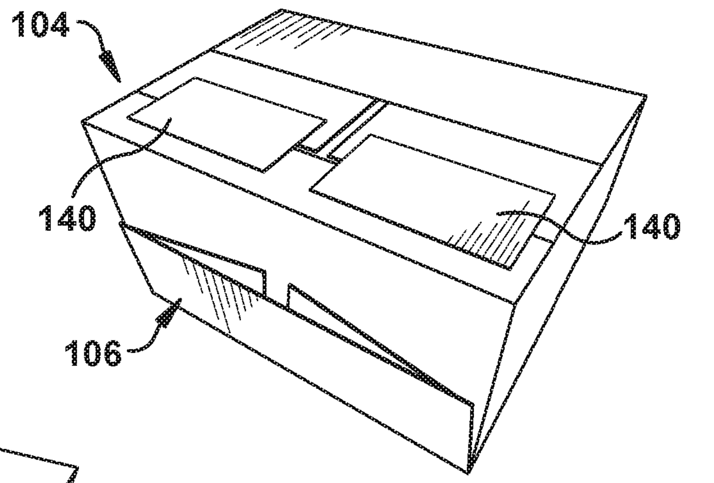
FIGS. 32 to 34 are schematic perspective view of a stack of sheet stock material with pre-applied splice tags being prepared for splicing.

In a fan-folded stack, a trailing end 106 of the C-fold sheet stock material may be drawn from a bottom of the stack and folded up the side of the stack (as shown in FIG. 32). The splice-tags 140 and the leading end 104 of the sheet stock material are folded to lay flat at the top of the stack or extended down a side of the stack. Strapping may be applied to secure the stack until ready for use.

Figure 33:
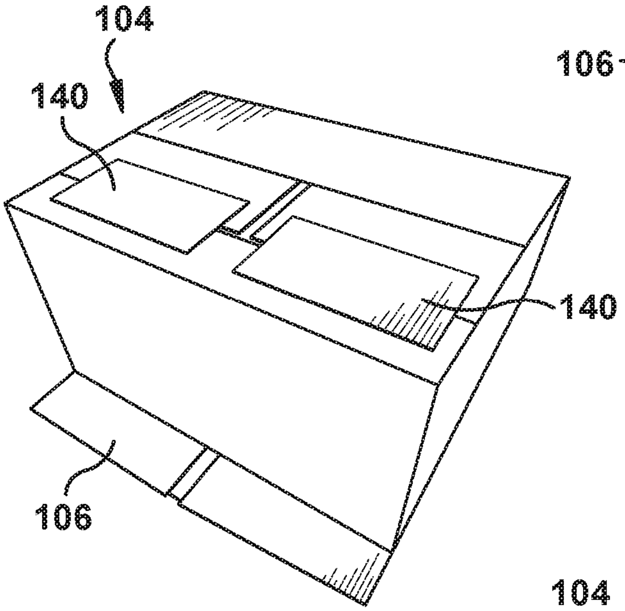
Figure 34:
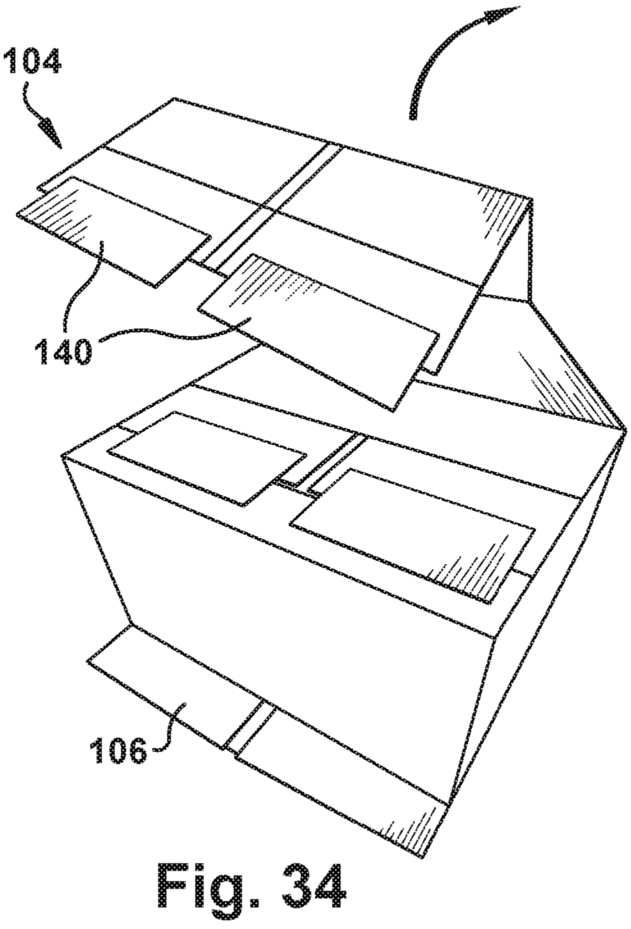

An exemplary stack of fan-fold C-fold sheet stock material with splice tags 140 pre-applied to a leading end 104 is shown and a method of splicing using such a C-fold sheet stock material will be described with reference to FIGS. 32 to 37. First, any strapping or bundling materials used to protect and secure the stack of sheet stock material for transport or storage are removed from the stack, as shown in FIG. 32. At this point, the leading end 104 is folded flat on a top side of the stack and a trailing end 106 extends parallel to one side. As shown in FIG. 33, the trailing end 106 may be folded out to extend from the side of the stack, and in FIG. 34 the leading end 104 has been unfolded to extend from the same side of the stack as the trailing end 106, ready to splice to another supply of C-fold sheet stock material.

Figure 35:
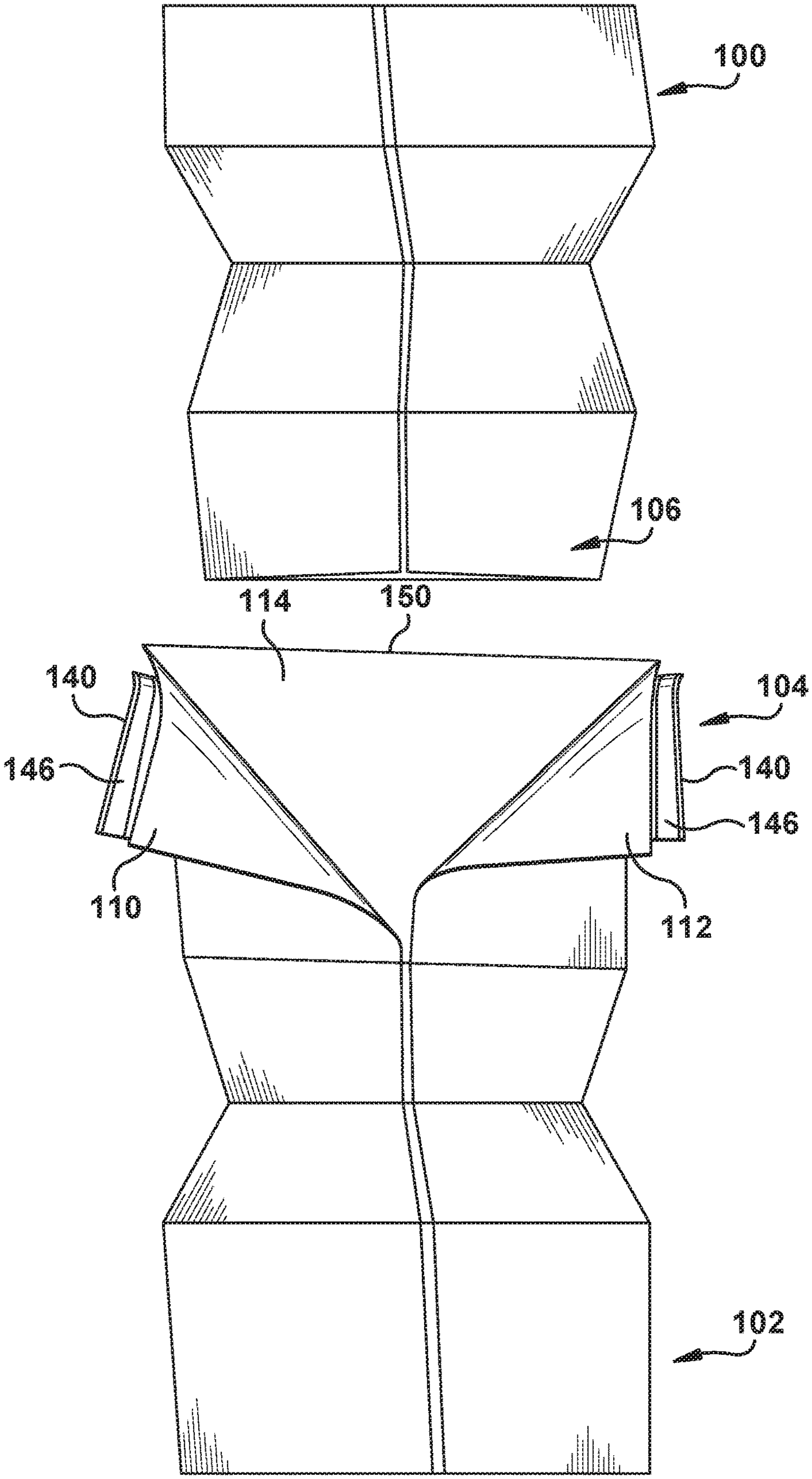
FIGS. 35 to 37 are sequential schematic perspective views of a trailing end of a leading supply of sheet stock material being spliced to a following supply of sheet stock material with splice tags at a leading end as shown in FIG. 33.
Figure 36:
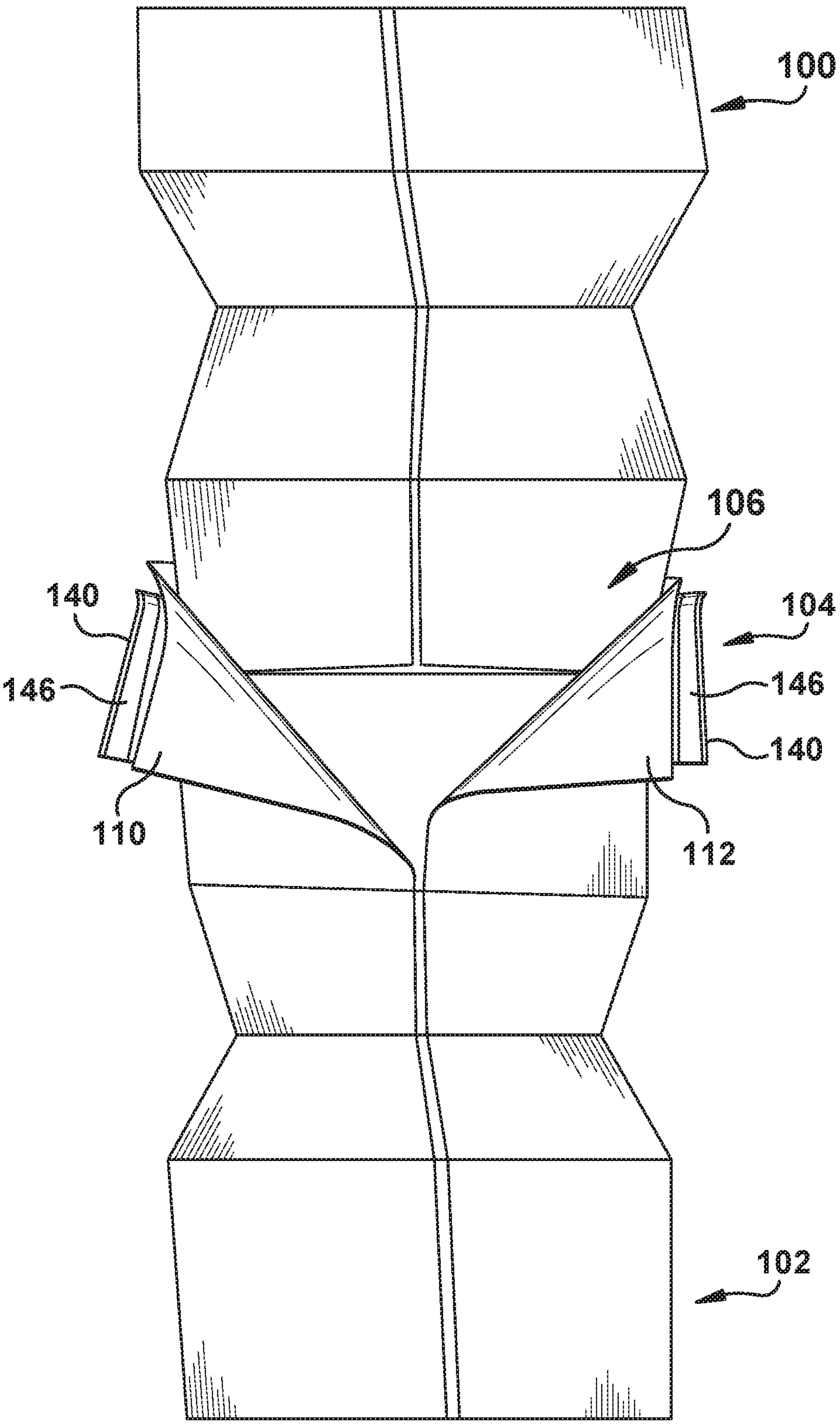
Figure 37:
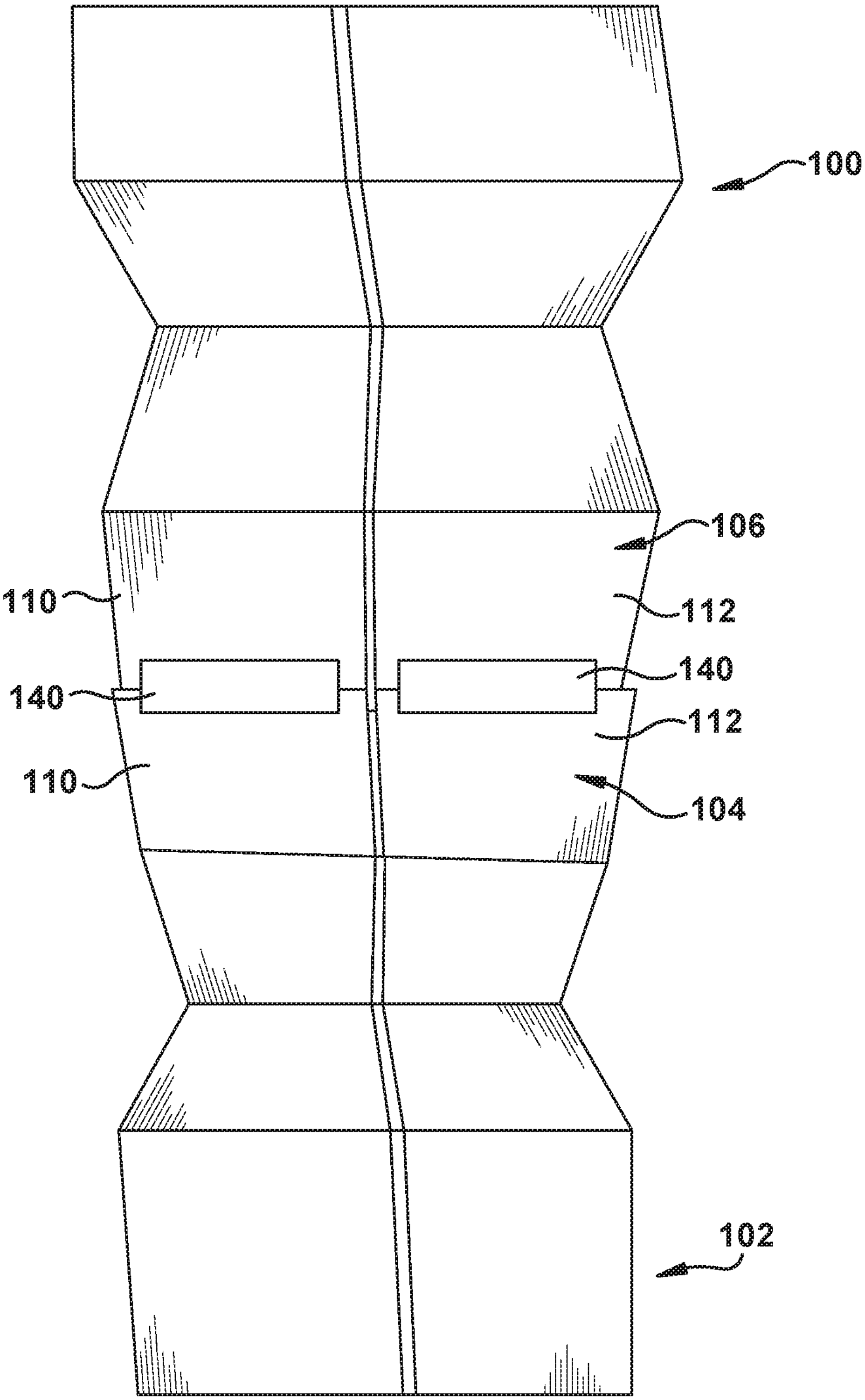

This leads to the configuration shown in FIG. 35, with a trailing end 106 of a leading supply 100 of C-fold sheet stock material ready to be spliced to a leading end 104 of a following supply 102 of C-fold sheet stock material. The trailing end 106 of the leading supply 100 may be from a stack of fan-folded sheet stock material to be placed on top of the following supply 102 (as shown in FIG. 20) or may extend from a dunnage conversion machine or be otherwise situated. The lateral portions 110 and 112 of the following supply 102 are opened up at the leading end 104 and the trailing end 106 from the leading supply 100 is inserted between the central portion 114 and the lateral portions 110 and 112 of the following supply 102 as shown in FIG. 36.

Adhesive tape segments or splice tags 140 are applied or pre-applied to the ends of the lateral portions 110 and 112 by removal of one of the release liners 146. The other release liner 146 may be left on the splice tag 140 until after the trailing end 106 is telescopically inserted into the leading end 104.

The release liners 146 are then removed from the respective splice tags 140 and pressed against respective lateral portions 110 and 112 of the trailing end 106 of the leading supply 100 of C-fold sheet stock material to attach or connect or otherwise secure respective lateral portions 110 and 112 of the leading end 104 of the following supply of sheet stock material to complete the splice. The trailing end 106 of the leading supply 100 of C-fold sheet stock material can then pull the leading end of the following supply 102 of C-fold sheet stock material into the dunnage conversion machine for conversion into a dunnage product. This splicing operation is quick and easy, requiring only the insertion of the trailing end 106 into the leading end 104 and the removal of two easily-accessible release liners 146 (FIG. 36) before pressing the splice tags 140 against the lateral portions 110 and 112 of the sheet stock material.

Alternatively, the end user may remove both of the release liners and press the adhesive tape across the junction between the leading and trailing ends 104 and 106. If the adhesive completely covers the backing on the splice tag, each splice tag may have only one release liner, meaning that the end user still only has to remove two release liners before applying the splice tags to the telescoped leading and trailing ends 104 and 106 of the C-fold sheet stock material.

Although the invention has been shown and described with respect to a certain illustrated embodiment or embodiments, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiment or embodiments of the invention.

The invention claimed is:

1. A supply of sheet stock material for a dunnage conversion machine that is readily spliced to another supply, comprising:

(a) one or more plies of sheet material having (i) multiple longitudinally-extending sections, including a center section bounded by lateral sections, where the lateral sections are folded over a common face of the center section along longitudinal fold lines at lateral edges of the folded sheet material; and (ii) a leading edge and a trailing edge at longitudinally-opposite ends of the sheet material; and (b) a splicing adhesive including at least two discrete and separated splicing adhesive segments, each of the at least two splicing adhesive segments applied to the sheet material adjacent the leading edge or the trailing edge on only each of the lateral sections, respectively, such that each of the splicing adhesive segments extends beyond the adjacent leading edge or trailing edge in such a manner to facilitate splicing each section to respective sections of another supply of sheet stock material.

2. A supply of sheet stock material for a dunnage conversion machine as set forth in claim 1, where the lateral sections are separated from the center section by a cut along respective longitudinal fold lines a distance of at least one centimeter.

3. A supply of sheet stock material for a dunnage conversion machine as set forth in claim 2, where the lateral sections are separated from the center section by a cut along the respective longitudinal fold lines a distance of one centimeter to fifteen centimeters.

4. A supply of sheet stock material for a dunnage conversion machine as set forth in claim 1, comprising two plies of sheet material.

5. A supply of sheet stock material for a dunnage conversion machine as set forth in claim 4, where the lateral sections of both plies of sheet material are inwardly folded over a common face of the center section.

6. A supply of sheet stock material for a dunnage conversion machine as set forth in claim 1, where the sheet stock material is folded along lateral fold lines in opposite directions at periodic longitudinally-spaced intervals to form a rectangular fan-fold stack.

7. A supply of sheet stock material for a dunnage conversion machine as set forth in claim 6, where adjacent the leading end of the sheet material a leading segment is folded along the nearest lateral fold line to extend down a side of the stack, and adjacent the trailing end of the sheet material a trailing segment is folded along the nearest lateral fold line to extend up the same side of the stack, and a strap around the stack holds the leading and trailing segments against the side of the stack.

8. A supply of sheet stock material for a dunnage conversion machine as set forth in claim 1, where at least one ply of sheet material includes kraft paper.

9. A supply of sheet stock material for a dunnage conversion machine as set forth in claim 1, where the splicing adhesive is provided by a double-sided tape, one side of which is secured to the sheet material and the other side of which is covered by a removable release liner.

* * * * *